(12) United States Patent
Moore et al.

(10) Patent No.: US 12,544,007 B2
(45) Date of Patent: Feb. 10, 2026

(54) NONINVASIVE TRANSDERMAL ALCOHOL SCREENING SYSTEM

(71) Applicant: SOBR SAFE, INC., Greenwood Village, CO (US)

(72) Inventors: Kevin Duane Moore, Boulder, CO (US); Katia Marguerite Benson, Boulder, CO (US); Bennett J. Meulendyk, Boulder, CO (US); Scott Bennett, Boulder, CO (US)

(73) Assignee: SOBR SAFE, INC., Greenwood Village, CO (US)

( * ) Notice: Subject to any disclaimer, the term of this patent is extended or adjusted under 35 U.S.C. 154(b) by 603 days.

(21) Appl. No.: 17/996,996

(22) PCT Filed: Apr. 23, 2021

(86) PCT No.: PCT/US2021/028833
§ 371 (c)(1),
(2) Date: Oct. 24, 2022

(87) PCT Pub. No.: WO2021/216996
PCT Pub. Date: Oct. 28, 2021

(65) Prior Publication Data
US 2023/0138641 A1    May 4, 2023

Related U.S. Application Data

(60) Provisional application No. 63/109,134, filed on Nov. 3, 2020, provisional application No. 63/014,776, filed on Apr. 24, 2020.

(51) Int. Cl.
*A61B 5/08*    (2006.01)
*A61B 5/00*    (2006.01)
(Continued)

(52) U.S. Cl.
CPC ............ *A61B 5/4845* (2013.01); *A61B 5/082* (2013.01); *A61B 5/1172* (2013.01);
(Continued)

(58) Field of Classification Search
CPC ..... A61B 5/4845; A61B 5/082; A61B 5/1172; A61B 5/14546; A61B 5/1477;
(Continued)

(56) References Cited

U.S. PATENT DOCUMENTS 7,930,927 B2    4/2011    Cooper et al.
8,165,824 B2    4/2012    Iiams et al.
(Continued)

FOREIGN PATENT DOCUMENTS

JP    2004-169524 A    6/2004
JP    2004249847 A    9/2004
(Continued)

OTHER PUBLICATIONS

B. Lawson, Khalifa Aguir, T. Fiorido, V. Martini-Laithier, R. Bouchakour, et al.. Skin alcohol perspiration measurements using MOX sensors. Sensors and Actuators B: Chemical, 2019, 280, pp. 306-312. ff10.1016/j.snb.2018.09.082ff. ffhal-01926647, Submitted on Nov. 19, 2018 (Year: 2018).*

(Continued)

*Primary Examiner* — Robert J Michaud
(74) *Attorney, Agent, or Firm* — Holzer Patel Drennan

(57) ABSTRACT

Disclosed herein are a non-invasive alcohol detection, identity management, access control, remote screening, and reporting systems.

19 Claims, 15 Drawing Sheets

(51) Int. Cl.
*A61B 5/1172* (2016.01)
*A61B 5/145* (2006.01)
*A61B 5/1477* (2006.01)
*G01N 33/497* (2006.01)

(52) U.S. Cl.
CPC ........ *A61B 5/14546* (2013.01); *A61B 5/1477* (2013.01); *A61B 5/6826* (2013.01); *G01N 33/4972* (2013.01); *A61B 2560/0431* (2013.01); *A61B 2562/0257* (2013.01); *A61B 2562/029* (2013.01)

(58) Field of Classification Search
CPC .......... A61B 5/6826; A61B 2560/0431; A61B 2560/0257; A61B 2560/029; G01N 33/4972
See application file for complete search history.

(56) References Cited

U.S. PATENT DOCUMENTS

| | | |
|---|---|---|
| 8,256,286 B2 | 9/2012 | Carroll et al. |
| 8,657,744 B2 | 2/2014 | Rompa et al. |
| 9,155,505 B2 | 10/2015 | Caduff et al. |
| 9,241,659 B2 | 1/2016 | Rompa et al. |
| 9,326,713 B2 | 5/2016 | Carroll et al. |
| 9,480,431 B2 | 11/2016 | Melton |
| 9,816,959 B2 | 11/2017 | Umasankar et al. |
| 9,855,000 B2 | 1/2018 | Lansdorp et al. |
| 10,786,189 B2 | 9/2020 | Lansdorp et al. |
| 11,006,895 B2 | 5/2021 | Nothacker et al. |
| 11,253,196 B2 | 2/2022 | Nothacker et al. |
| 11,278,222 B2 | 3/2022 | Moeller et al. |
| 11,324,449 B2 | 5/2022 | Nothacker et al. |
| 2004/0236199 A1 | 11/2004 | Hawthorne et al. |
| 2005/0009195 A1 | 1/2005 | Wang |
| 2008/0009693 A1 | 1/2008 | Hawthorne et al. |
| 2009/0182216 A1 | 7/2009 | Roushey et al. |
| 2010/0010689 A1 | 1/2010 | Yasushi et al. |
| 2011/0154887 A1 | 6/2011 | Cooper et al. |
| 2012/0253154 A1 | 10/2012 | Phillips et al. |
| 2014/0365142 A1 | 12/2014 | Baldwin |
| 2015/0212063 A1* | 7/2015 | Wojcik ................. G06V 40/167 340/576 |
| 2017/0023509 A1 | 1/2017 | Kim et al. |
| 2017/0035332 A1 | 2/2017 | Wahnschafft |
| 2018/0049668 A1 | 2/2018 | Defant et al. |
| 2018/0056302 A1 | 3/2018 | Ahmad et al. |
| 2018/0116605 A1* | 5/2018 | Newberry ................ A61B 5/01 |
| 2018/0209955 A1 | 7/2018 | Moeller |
| 2019/0082800 A1 | 3/2019 | Baranski et al. |
| 2019/0290197 A1 | 9/2019 | Nothacker et al. |
| 2022/0007972 A1 | 1/2022 | Thors et al. |
| 2022/0071505 A1 | 3/2022 | Bosua |
| 2022/0084672 A1 | 3/2022 | Hall |
| 2022/0133226 A1* | 5/2022 | Nothacker ............. A61B 5/681 340/539.12 |
| 2022/0218277 A1 | 7/2022 | Nothacker |
| 2022/0240849 A1 | 8/2022 | Spector et al. |

FOREIGN PATENT DOCUMENTS

| | | |
|---|---|---|
| JP | 2012-198648 A | 10/2012 |
| WO | 2021216996 A1 | 10/2021 |
| WO | 2022099262 A1 | 5/2022 |

OTHER PUBLICATIONS

International Search Report and Written Opinion, dated Mar. 14, 2022, from corresponding PCT application No. PCT/US2021/072203.

International Search Report, dated Aug. 26, 2021, from corresponding PCT application No. PCT/US2021/028833.

Written Opinion, dated Aug. 26, 2021, from corresponding PCT application No. PCT/US2021/028833.

* cited by examiner

NONINVASIVE TRANSDERMAL ALCOHOL SCREENING SYSTEM

CROSS-REFERENCE TO RELATED APPLICATIONS

This application relates to and is entitled to the benefit of the earlier filing dates and priority of: U.S. Provisional Patent Application Ser. No. 63/014,776, entitled "Noninvasive Transdermal Alcohol Screening System," filed Apr. 24, 2020, Gary J. Graham, et al.; and U.S. Provisional Patent Application Ser. No. 63/109,134, entitled "Wearable Data Collection Device with Non-invasive Sensing," filed Nov. 3, 2020, Katia M. Benson, et al., the disclosures of which are herein incorporated by reference in their entirety.

BACKGROUND OF THE INVENTION

Field of the Invention

The present invention relates generally to alcohol detection systems and more particularly to non-invasive, ethanol or alcohol testing, screening, or monitoring of human subjects.

Description of the Background

Alcohol detection in human subjects is generally known, see for example US patent applications: 20130035602; and U.S. Pat. Nos. 3,764,270; 3,831,707; 3,815,087; 3,904,251; 4,613,845; 4,738,333; 4,749,553; 4,843,377; 4,914,038; 5,220,919; 5,944,661; 6,075,444; 6,229,908; 6,620,108; 7,311,665; 7,377,186; 7,616,123; 8,795,484; 9,296,298; 9,784,708 B2 and Japanese publications: JP4940350B2; JP2004169524A2, the disclosures of which are incorporated herein by reference in their entirety.

As stated in published U.S. Patent Application 20130035602: "According to methods known in the art, such as a bracelet, periodically capture alcohol readings by sampling the insensible perspiration collected from the air above the skin, may not be accurate and may not provide adequate proof in court. Such methods rely on the monitored person not removing the bracelet and do not include positive identification devices."

Despite the vast amount of work done in the field, the market, outside of novelty devices, has gone to either continuous monitoring of a single individual using a transdermal device, or to discrete testing using breath analysis correlated to blood alcohol content. It has been found that transdermal systems have difficulty accurately detecting blood alcohol content across a population under varied environmental and/or subject matter conditions. Breath testing using sharable devices also presents an increased risk of exposure to infectious disease.

Therefore, there is a need for a non-invasive, alcohol detection and screening system that does not use breath testing or continuous, single user monitoring. There is also a need for a non-invasive, alcohol detection system that is more accurate across multiple users under varied environmental conditions and/or test subject physiology.

SUMMARY OF THE INVENTION

Provided herein are methods and devices for alcohol testing and/or screening and/or monitoring of human subjects. As disclosed herein alcohol may permeate through the skin of a subject who has consumed alcoholic beverages. Transdermal alcohol testing can measure the concentration of alcohol that has permeated through and present above the skin. While the benefits of a transdermal alcohol screening device can be varied and numerous, one benefit of an improved device, depending on the embodiment, could be as a deterrent to those coming to work impaired. One such solution will prioritize prevention over reaction. A more reliable, non-invasive, alcohol detection system could be used: to reduce accidents in the workplace related to alcohol impairment, by law enforcement, emergency response, to identify alcohol consumption, to deter or detect drinking and driving, or to enhance personal health, wellness, or safety. Another benefit could be to change workplace and/or societal behaviors and mindsets. Changing behaviors and mindsets could save lives, reduce accidents, improve safety, and/or enhance workplace productivity. These and/or other benefits may be realized from the ensuing disclosure.

In accordance with the disclosure herein, the amount of alcohol permeating through the skin may be correlated to one or more of alcohol consumption, intoxication, risk, breath alcohol content, and/or blood alcohol content.

In one embodiment there is provided a go/no go device alcohol detector. A go/no device alcohol detector may provide an opportunity for a simplified solution by increasing the level of abstraction of detection results obtained with less overhead, reduced error, lowered cost, increased accuracy, or higher reliability.

In another embodiment there is provided an alcohol screening solution that is noninvasive and unconcerned with determining a true Blood Alcohol Content (BAC) score. The alcohol screening solution may be abstracted and correlated to risk. The risk may be scored or equated to a function of transdermal alcohol concentration presented above the skin.

In another embodiment there is provided a non-invasive, alcohol detection, identity management, access control and/or remote reporting system. A remote reporting system can empower the use of data to provide key decision makers increased transparency into potential trends within their organizations.

The alcohol detection and/or screening system for alcohol may be part of an access control system. The access control system may control an access control device. The access control device may be a door, lock, starter, switch, access gate or turnstile.

The alcohol detection and/or screening system for alcohol may be used by drivers, machine operators, and those with positions where a clear mind is needed for the safety of persons, property, and the environment.

The alcohol detection and/or screening system for alcohol may be part of an emergency responder's and/or law enforcer's tool kit for detecting alcohol consumption and/or individual identification.

In another embodiment there is provided a system with data analytics for users who can make informed decisions on actions and improvements in their organizations or communities.

In another embodiment there is provided a method for the remote screening of human subjects for alcohol. The method may include one or more of the steps of: providing a biometric identification scanner configured to produce an identification response upon activation; providing a transdermal alcohol sensor configured to produce an alcohol response; scanning biometric properties from one or more digits upon activation of the scanner to produce an identification response; sensing transdermal alcohol proximate in time to the scanning of biometric properties to produce an alcohol response; generating a pass-fail response from the alcohol response; and reporting the pass-fail response. The alcohol response may be paired with the identification response. Paring the alcohol response with the identification response may allow documentation or attribution of the results to a specific individual.

In another embodiment there is provided an alcohol detection system including a testing apparatus with a transdermal alcohol sensor configured to produce an alcohol response upon activation.

The alcohol detection system may include a biometric identification scanner. The biometric identification scanner maybe one or more of a fingerprint scanner or finger vein scanner. The biometric identification scanner may evaluate the internal and/or external surface points on a person's finger to identify them.

In another embodiment there is provided an alcohol detection system including a free form, centralized, intermittent, multiuser, digit testing apparatus with a biometric identification scanner.

In another embodiment there is provided an alcohol detection system including a free form, intermittent, multiuser, digit testing apparatus; a biometric identification scanner configured to produce an identification response upon activation, the scanner supported by the testing apparatus; and a transdermal alcohol sensor configured to produce an alcohol response upon activation. The sensor may be supported by the testing apparatus and disposed neighboring the scanner where the alcohol response can be synchronized with the identification response.

In another embodiment there is provided an alcohol detection system including a portable, intermittent, multiuser, digit testing apparatus with a biometric identification scanner. A portable device may be sized for easy carrying.

Various additional embodiments, which may be combined with one or more other embodiments, include the following:
a. An alcohol detection system for screening human subjects having a centralized sensor or testing apparatus.
b. An alcohol detection system for screening human subjects for alcohol wherein the sensor and scanner form part of a test region, the test region having a hood.
c. An alcohol detection system for screening wherein the sensor and scanner form part of a test region, the test region having a cover.
d. An alcohol detection system wherein the sensor is a fuel cell sensor;
e. An alcohol detection system wherein the sensor is an amperometric, electrochemical sensor;
f. An alcohol detection system wherein the alcohol sensor is a MEMS device;
g. An alcohol detection system for monitoring alcohol wherein the testing apparatus includes one or more of an environmental compensation to the alcohol sensor.
h. An alcohol detection system for monitoring alcohol wherein the testing apparatus includes test subject compensation.
i. An alcohol detection system for monitoring alcohol wherein the testing apparatus includes test condition compensation.
j. An alcohol detection system for screening alcohol wherein the testing apparatus includes a processor configured to generate a pass-fail response paired with the identification response.
k. Or any combination.

Various additional embodiments which may be combined with one or more other embodiments include:

a. An alcohol detection system for monitoring alcohol including a gas headspace at the sensor. In operation the head space may be closed off by the subject during activation of the sensor.
b. An alcohol detection system for monitoring alcohol wherein the sensor has a reaction response time ≤15, seconds or ≤10, seconds.
c. An alcohol detection system for monitoring alcohol wherein the sensor has a recovery response time ≤15 seconds, or ≤10 seconds, or ≤the 3 seconds.
d. An alcohol detection system for screening alcohol wherein the biometric identification scanner further includes a biometric finger identification authentication.
e. An alcohol detection system for screening alcohol wherein the digit testing apparatus further includes a network communication module.
f. An apparatus with germ mitigation. Suitable germ mitigation devices may include a UV light system. The germ mitigation device may be connected to a cover or a hood of the apparatus.

In another embodiment there is provided a method for screening human subjects for alcohol including the steps of (in no particular order of operation): providing a digit testing apparatus, the digit testing apparatus having an intermittent, transdermal alcohol sensor accessible by multiple users; providing a biometric identification scanner; scanning biometric identification information with the biometric identification scanner upon a presentation of one or more digits to the testing apparatus to generate identification data; checking the one or more digits for transdermal alcohol proximate in time with the scanning biometric identification information; acquiring a transdermal alcohol response; equating the response to a go/no-go result. The identification data may be validated to one or more of the multiple users. The identification data and the go/no-go result may be transmitted to a remote application and/or indicated locally.

Various additional embodiments, which may be combined with one or more other embodiments, include:
a. A method wherein the scanning is synchronized with the checking and authentication of the biometric identification information.
b. A method wherein the scanning is coordinated with the checking and matching of the biometric identification information from a remote database.
c. A method wherein the application includes one or more dashboards with one or more fields of history, trends, analytics, or alerts for one or more of individuals, groups, or whole company.
d. A method wherein the remote application may be a hosted application. The hosted application may be provided as a software as a service.
e. A method wherein the digit testing apparatus may be centralized to multiple business operations or processes.
f. A method wherein the digit testing apparatus is portable.
g. A method wherein the digit testing apparatus may be part of an access control system accepting or denying access.
h. A method wherein germ mitigation is applied after sensing.
i. Or any combination.

For a more complete understanding of the claimed invention(s), reference is now made to the accompanying drawings and detailed description of preferred embodiments. Throughout the several figures and views, like symbols refer to like elements. Furthermore, method steps unless specifically designated or limited by impossibility may be performed in any order.

BRIEF DESCRIPTION OF THE DRAWINGS

FIGS. 3a-3c show an environmental view of an embodiment of an apparatus having an alcohol sensor and/or biometric scanner;

DETAILED DESCRIPTION OF THE PREFERRED EMBODIMENTS

Figure 1:
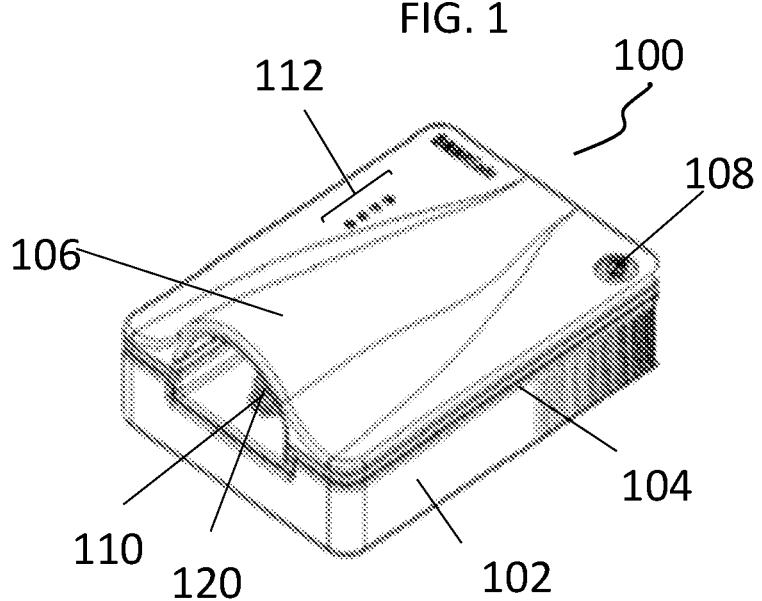
FIG. 1 is an environmental view of an embodiment of an apparatus having an alcohol sensor and/or biometric scanner.

Provided herein are methods and devices for alcohol testing and/or screening and/or monitoring of human subjects. While the benefits can be varied and numerous, one benefit of an improved device depending on the embodiment could be as a deterrent to those coming to work impaired. One such solution will prioritize prevention over reaction. A more reliable, non-invasive, alcohol detection and remote reporting system could be used to reduce accidents in the workplace related to alcohol impairment. Another benefit could be to change workplace and/or societal behaviors and mindsets. Changing behaviors and mindsets could save lives and/or enhance workplace productivity. These and/or other benefits may be realized from the ensuing disclosure.

Alcohol may permeate through the skin of a subject who has consumed alcoholic beverages. The transdermal alcohol testing device of the present disclosure can detect the concentration of alcohol present above the skin. The amount of alcohol permeating through and present above the skin may be correlated to alcohol consumption, intoxication, risk, breath alcohol content, and/or blood alcohol content.

The alcohol detection and/or screening system for alcohol may be used for access control or form part of an access control system. Suitable access control systems include a door, lock, switch, equipment, ignition, access gate or turnstile.

In one embodiment there is provided a go/no go device. A go/no go device may provide an opportunity for a simplified solution with less overhead or cost. The go/no go device may be correlated to risk.

In another embodiment there is provided a non-invasive, alcohol detection, identity management, access control and remote reporting system. A remote reporting system can empower the use of data to provide key decision makers increased transparency into potential trends within their organizations.

In another embodiment there is provided a system with data analytics for users who can make informed decisions on actions and improvements in their organizations.

In another embodiment there is provided an alcohol screening solution that is noninvasive and unconcerned with determining a true Blood Alcohol Content (BAC) score.

In another embodiment there is provided a method for the remote screening of human subjects for alcohol. The method may include one or more of the steps of: providing a biometric identification scanner configured to produce an identification response upon activation; providing a transdermal alcohol sensor configured to produce an alcohol response upon activation; scanning biometric properties from one or more digits upon activation of the scanner to produce an identification response; sensing transdermal alcohol proximate in time to the scanning of biometric properties to produce an alcohol response; generating a pass-fail response from the alcohol response paired with the identification response; and reporting the pass-fail response.

In another embodiment there is provided an alcohol detection system including a testing apparatus with one or more non-invasive, alcohol sensors configured to produce an alcohol response upon activation. A single alcohol sensor or any number of like kind or different sensors may be used. The one or more alcohol sensors may be a transdermal alcohol sensor or a subdermal alcohol sensor. The transdermal alcohol sensor may be one or more of: an electrochemical sensor, a fuel cell sensor, MEMS sensor, or metal oxide semiconductor sensor. The sensor may include a light source, laser, LED, optical detector, or spectrometer with infrared, near-infrared, and/or Raman detector.

The device may have electronics or electrical components connected to the one or more sensors. The electronics or electrical components may include a power source and/or conductors connected to the one or more sensors, various integrated circuits, memory, PCB, processor(s), modules, busses, connectors, boards and electrodes. The power source may be a battery or power adapter. The device may include one of more communication modules or interfaces. The device may have a physical, hard-wired data interface. The hard-wired data interface may be a serial port, USB port, or any other suitable communication port. The device may have a wireless input/output data interface. The wireless interface may be a radio communications module. Suitable radio communication modules include WiFi and Bluetooth modules. The data interfaces may be used for one or more of transmitting data into and/or out of the device, installing or updating firmware, installing or updating the operating system, installing or updating software, algorithms, or applications, transmitting data remotely, recharging a battery, or any other suitable use.

The device may include one or more non-invasive, alcohol sensors configured to produce an alcohol response upon activation or use. The use may be performed in any suitable manner including manual, automatic, continuous, discrete, timed, or random. Activation may be controlled by a microprocessor, analogue circuit, and/or software. A single alcohol sensor, or any number of like kind, or different kind sensors may be used as part of an alcohol detection module. The alcohol detection module may include suitable electronics, including: one or more of a front-end, amplification, filtering, feedback, potentiostat, ADC, microprocessor, power, biasing current, memory or any other suitable electronic component. The one or more alcohol sensors may be transdermal alcohol sensors. The one or more alcohol sensors may be a subdermal alcohol sensor(s). The alcohol sensor may be one or more of an electrochemical sensor, fuel cell sensor, electromagnetic sensor, optical sensor, electrochemical graphene sensor or semiconductor sensor. A suitable semiconductor sensor is a metal oxide, semiconductor sensor. A suitable electromagnetic sensor may be a light-based or optical sensor using UV, visible, infrared, near-infrared radiation, and/or Raman spectroscopy. The sensor may sense transdermal alcohol, subdermal alcohol, or both. A particularly suitable sensor is an amperometric, electrochemical gas sensor including an electrolyte, 3 electrodes in contact with the electrolyte, and one or more filters. The sensor may be configured on a module including a potentiostat.

The device may include one or more electrochemical sensors. An electrochemical sensor is a device that measures the concentration of a target analyte by oxidizing or reducing a target analyte at an electrode and measuring the resulting current. The target analyte may be a gas or liquid. The electrochemical sensor may be made up of any suitable components including: a filter stack, an electrode assembly, and an electrolyte. The electrode assembly may include at least one sensing electrode and at least one common electrode. The electrode assembly may also include a reference electrode. The electrodes may be porous and made from platinum, binder and other suitable materials. The sensor may have an electrolyte. The electrolyte may be aqueous. The electrodes may contact the electrolyte. In practice gas may diffuse to the sensing electrode at the electrolyte boundary and undergo oxidation/reduction generating current. The current may be converted to a voltage. The resulting voltage or current may be measured directly or converted to a digital form. The resulting readings may then be correlated to a predicted analyte detection or concentration.

The electrochemical sensor may have a T90 reaction time <15 seconds and more preferably a T90 time <10 seconds. The reaction time and/or recovery time may be obtained at static or passive conditions such as attained without a fan or active ventilation. The times may be measured at an environmental temperature of 23 C, 1 atm, 50% RH. The sensor may be operable at a relative humidity range of 10 to 95%, a pressure range of 0.8 to 1.2 atm and/or a temperature range of −30 to 50 degrees C. The sensor may include a filter to reduce the effect of potentially interfering gases, water intrusion, or particulate matter. The filter may be a prefilter or post filter depending on the gas or analyte being detected and the type of sensor. The filter may be a screen. The screen may be metal. Suitable filters may be chosen based on porosity, material reactivity, and material selectivity. The prefilter may be specific to one or may potentially interfering gases. Suitable prefilters may be selective for Carbon Monoxide, Hydrogen Sulfide, Nitric Oxide, Sulfur Dioxide, Chlorine, n-Heptane, and other Organics.

The electrochemical sensor may be placed in a sensor module. The sensor module may include a potentiostat and/or ADC. A potentiostat is electronic hardware used to control an electrochemical cell, such as a three-electrode electrochemical cell. During operation of the sensor the potentiostat may control the voltage potential between the sensing electrode and a reference electrode. This control helps to maintain a regulated system during operation. The potentiostat may then convert the resulting current to voltage. The electronics may include an ADC. The ADC may convert the voltage readings to a digital reading for the processor The alcohol detection system may include a biometric identification scanner. The biometric identification scanner maybe one or more of a fingerprint scanner or finger vein scanner. The biometric identification scanner may be light based, electrical, capacitive, or other suitable pattern detection system. The biometric identification scanner may be used to identify a test subject by evaluating the internal and/or external surface points on a person's finger, the veins or both.

In another embodiment there is provided an alcohol detection system including a portable, intermittent, multiuser, digit testing apparatus with a biometric identification scanner. A portable device may be sized for easy carrying. The device may be sized to fit in a pocket, purse, phone case, key chain, or any other suitable carrying device. The alcohol sensor module including housing (apparatus) may be small in form with a maximum length, width, and height. The apparatus max length may be ≤8 cm, ≤6 cm, ≤4 cm, ≤3 cm, ≤2 cm, ≤1.5 cm or ≤1 cm. The max width may be ≤8 cm, ≤6 cm, ≤4 cm, ≤3 cm, ≤2 cm, ≤1.5 cm or ≤1 cm. The max height may be ≤8 cm, ≤6 cm, ≤4 cm, ≤3 cm, ≤2 cm, ≤1.5 cm or ≤1 cm. The sensor and scanner may reside in separate or a single housing. The sensor and scanner may reside under the same protective cover.

In another embodiment there is provided an alcohol detection system including a free form, intermittent, multiuser, digit testing apparatus; a biometric identification scanner configured to produce an identification response upon activation, the scanner supported by the testing apparatus; and a transdermal alcohol sensor configured to produce an alcohol response upon activation, the sensor supported by the testing apparatus and disposed neighboring the scanner where the alcohol response is synchronized with the identification response.

In another embodiment there is provided an alcohol detection system including a free form, intermittent, multiuser, digit testing apparatus with a biometric identification scanner.

Various additional embodiments which may be combined with one or more other embodiments include the following:
  a. An alcohol detection system for screening human subjects having a centralized sensor or testing apparatus.
  b. An alcohol detection system for screening human subjects for alcohol wherein the sensor and scanner form part of a test region, the test region having a hood.

c. An alcohol detection system for screening wherein the sensor and scanner form part of a test region, the test region having a cover.
d. An alcohol detection system wherein the sensor is a fuel cell sensor;
e. An alcohol detection system for monitoring alcohol wherein the testing apparatus includes a temperature compensator and/or a humidity compensator and/or a barometric pressure compensator. The temperature compensator and/or the humidity compensator may be disposed in the gas headspace of the sensor system.
f. An alcohol detection system for screening alcohol wherein the testing apparatus includes a processor configured to generate a pass-fail response paired with the identification response.
g. A means of detecting if a test subject is intentionally or unintentionally defeating the detection methodology. The means of detecting or detecting device may be an anti-spoofing device. The detecting device may include light, electrical, touch, chemical, one or more of a radiant energy scanner, optical scanner, capacitive sensor, an ECG device, conductive electrodes, capacitive sensor, or any other suitable device. The alcohol detection system may include an electrical detection device. The electrical detection device may include 2, 3 or more dry electrodes. The electrodes may be coupled to an analogue front end, ADC and processor to measure skin conductance, skin impedance, ECG, or another biometric electrical signal. The signal may be used for liveness detection and/or biometric identification. In the case of ECG, ECG may be used to identify or confirm the identification of a test subject through characteristic heartbeat pattern. The device may evaluate a heartbeat profile or pulse profile to predict or aid in the prediction of a person's identity. A suitable scanner may be a heartbeat profile scanner which may identify certain PQRST profile patterns based off the PQRST heartbeat wave form. The profile may be created from an ECG device. The alcohol detection system may include a humidity sensor system. A humidity sensor system may detect humidity profiles at the alcohol sensor which can be used to determine proper placement of the test subject in proximity to the sensor. The humidity sensor system may be configured to sense changes in humidity of the headspace to at least partially discern the presence of a skin exposure to the alcohol sensor through the signal profile. The alcohol detection system may include one or more touch sensors. The touch sensor(s) may be configured to detect the presence of a digit in proximity to an alcohol sensor or biometric identification sensor. The touch sensor may be pressure or capacitive. The touch sensors may be discrete or continuous about the sensor. The touch sensors may be disposed in one or more of the four quadrants surrounding the alcohol sensor. The touch sensor may be continuous covering 360 degrees. The alcohol detection system may include a light base detection which may use one or more LEDs and optical sensors. The LED/optical sensors may detect reflect light, absorbed light, or both. The light base detection may detect the presence of a test subject, may detect heat, pulse, heart rate, or liveness.
h. Or any combination of featured disclosed in the specification.

Various additional embodiments which may be combined with one or more other embodiments include:

a. An alcohol detection system for monitoring alcohol including a gas headspace at the sensor. In operation the headspace may be closed off by the subject during activation of the sensor.
b. An alcohol detection system for monitoring alcohol wherein the sensor has a reaction response time ≤15 seconds or ≤10 seconds. An alcohol detection system for monitoring alcohol wherein the sensor has a recovery response time ≤15 seconds or ≤10 seconds, or ≤3 seconds. The reaction response time may be timed from when alcohol data is being detected. The reaction recovery time may be timed from when the test subject is removed from the device. A reaction response time may be a time it takes to collect reliable data at the sensor. The reaction recovery time may be a time that it takes for the sensor to recover for a reliable result to be produced by a following test subject. The reaction recovery time may be measured based on disruption of the base line signal. The reaction response and reaction recovery times may be determined by an exposure of the alcohol sensor to a 2 ppm wt./vol. ethanol solution in a temperature range of 15° C. to 30° C. and a narrower range of 20° C. to 27° C.
c. An alcohol detection system for monitoring alcohol wherein the testing apparatus includes one or more of an environmental compensation to the alcohol sensor or response. Environmental compensation may be provided by a temperature compensator and/or a humidity compensator and/or a barometric pressure compensator and/or one or more additional sensors that have a different sensitivity response to ethanol or to cross interferants.
d. An alcohol detection system for monitoring alcohol wherein the testing apparatus includes test condition compensation. Test condition compensation may include environmental compensation factors, air quality, background alcohol, potential for cross interferences, potential for defeating methodologies, location information, work environment, as well as other factors.
e. An alcohol detection system for monitoring alcohol wherein the testing apparatus includes test subject compensation. Test subject compensation may be provided by one or more of determining a test subjects metabolic physiology for alcohol metabolism, age, sex, weight, drug use, genetics, history, factors impacting alcohol metabolism, respiration, quantity of alcohol respiration, rate of respiration, timing of respiration, timing of peak respiration, timing of first detectable traces of alcohol, and timing of alcohol clearance. One or more test subject compensation factors may be designated with a compensation factor with high, medium, or low categories that can add a compensation factor to alcohol detection or can be part of the alcohol detection algorithm.
f. An alcohol detection system wherein the testing apparatus is temperature controlled. The temperature control may be provided by one or more heating or cooling devices. The device may be maintained at a normal operating temperature range of 15 to 40 degrees C. The testing apparatus may have a heat setting to activate at <15 degrees C., <20 degrees C., <25 degrees C., <27 degrees C., <30 degrees C. or <40 degrees C. The heat setting may terminate at >25 degrees C., >27 degrees C., >30 degrees C. or ≥40 degrees C. Heating may be provided by adding one or more heating elements to the inside of the apparatus. Temperature control may allow for a more predictable or enhanced signal response.

g. An alcohol detection system for screening alcohol wherein the biometric identification scanner further includes biometric finger identification authentication.

h. An alcohol detection system for screening alcohol wherein the digit testing apparatus further includes a network communication module.

i. An apparatus with germ mitigation. Suitable germ mitigation may be provided by a UV light system. The germ mitigation may be provided in a cover or hood of the apparatus. The light system may have a spectrum of wavelengths at a power intensity effective against viruses, bacterial and/or fungus. UV rays may be one or more of UVA, UVB, and UVC. Wavelengths suitable for germ mitigation include those from 200 to 320 nanometers, 200 to 280, 220 to 280 or any other suitable range effective for germicidal activity. The UV rays may be provided by one or more UV light wands, discharge lamps, LEDs, lasers, solid state semiconductors, bulbs, or any other suitable device. The UV light source may be a light strip or a surface mount light chip with multiple LEDs. The UV source may be mounted to any suitable place on the apparatus. The germ mitigation may be focused on contact surfaces or on the entire testing area. The contact surface and exposure areas may be made of a material resistant to UV degradation. The UV light source may be mounted to a hood or cover.

In another embodiment there is provided a method for screening human subjects for alcohol including the steps of (in no particular order of operation): providing a digit testing apparatus, the digit testing apparatus having an intermittent, transdermal alcohol sensor accessible by multiple users and a biometric identification scanner validated to one or more of the multiple users; scanning biometric identification information with the biometric identification scanner upon a presentation of one or more digits to the testing apparatus to generate identification data; checking the one or more digits for transdermal alcohol proximate in time with the scanning biometric identification information; acquiring a transdermal alcohol response; equating the response to a go/no-go result; and transmitting the identification data and the go/no-go result to a remote application.

Various additional embodiments which may be combined with one or more other embodiments include:

a. A method wherein the scanning is synchronized with the checking and an authentication of the biometric identification information.

b. A method wherein the application includes one or more dashboards with one or more fields of history, trends, analytics, or alerts for one or more of individuals, groups, or whole company.

c. A method wherein the remote application may be a hosted application; a method wherein the hosted application may be a software as a service.

d. A method wherein the digit testing apparatus may be centralized to multiple business operations or processes.

e. A method wherein the digit testing apparatus may be part of an access control system accepting or denying access.

f. A method wherein germ mitigation is applied after sensing.

g. Or any combination.

The alcohol detection system may be provided with an analyte overload indicator. An analyte overload indication can be used to prevent a sensor from becoming over saturated with a target analyte, such as ethanol in the case where a test subject has used an alcohol-based hand sanitizer. The analyte overload indicator may be configured to provide a response at a lower indication level of 10 ppm, 20 ppm or 40 ppm, or greater w/v ethanol/water. The response may include one or more of haptic, vibration, light, sound or any other suitable response, indicator, or warning device. The response may include an aggressive haptic, physical, sound, or tactile demonstration aimed at encouraging a test subject to rapidly remove their hand from the system. By having a test subject rapidly remove their hand from the device less recovery time is needed for the sensor in an over exposure event.

The alcohol detection system may include a testing time delay indicator. A testing time delay indicator may be provided by one or more of haptic, light, sound, vibration, or any other suitable response indicator. In a multi-user environment where a first test subject has a high level of transdermal alcohol or alcohol contaminant, testing of the subject may cause a disruption in the sensor signal baseline or sensor chemistry possibly affecting the results of a second user. A delay indicator provided after an alcohol present response is detected from a first test subject may allow a more accurate test result of a following test subject.

The alcohol detection system may be used for monitoring alcohol consumption by human subjects. The alcohol sensor may be configured to sense human respiration and generate an alcohol present or not present response. A degree of alcohol presence may also be provided. The degree may be abstract, pass/fail, or may be one or more of a high, medium, or low indication or its equivalence.

The alcohol present or not present response may be limited to a binary response or other abstract response. The alcohol response may be paired with the identification response. The alcohol sensor response may be provided with test subject compensation and/or environmental compensation.

A suitable alcohol sensor may be set with the lowest alcohol present response configured to indicate at between 1 ppm w/v ethanol/water and 8 ppm w/v ethanol/water. The sensor with a lowest alcohol present response may be configured to indicate at >1 ppm w/v ethanol/water and <6 ppm w/v ethanol/water. The alcohol sensor may indicate alcohol at greater than or equal to: 1 ppm, 1.5 ppm, 2 ppm, 3 ppm, 4 ppm, 5 ppm, 6 ppm w/v ethanol/water. The alcohol sensor lowest alcohol response may indicate alcohol at less than or equal to: 8 ppm, 7 ppm, 6 ppm, 5 ppm, 4 ppm, 3 ppm, 2 ppm, 1.5 ppm, 1 ppm w/v ethanol/water.

The alcohol detection system may include an alcohol detection algorithm that uses the alcohol sensor signal and any compensation data. In one embodiment the sensor provides a baseline signal that can vary over time by greater than 10%. The alcohol present or not present response detection may be derived by an algorithm that includes the rate of change of the sensor signal.

The alcohol detection system may include a wireless radio wave network communication module. The module may receive information from the alcohol sensor. The module may be connected so as to communicate data or information over the internet. The module may include WiFi or communication based on the IEEE 802.11 family of standards. The module may include communication through Bluetooth®, BLE or other wireless radio wave protocol. The module may allow for local area networking of devices and internet access. The module may also allow nearby digital devices to exchange data with it by radio waves. The module may be positioned about the apparatus to deliver less than 30 seconds of radio wave exposure to a test subject during normal use at a distance of 20 cm or less between the module and the test subject. The module may be positioned about the apparatus at a distance of 20 cm or greater from the sensing touch points of the human subject during scanning or sensing.

An apparatus for monitoring transdermal alcohol of human subjects with an identification feature may support testing of multiple test subjects. Biometric identification may be authenticated from a local data source, such as flash memory disposed on a PCB. Biometric identification data may be sent to a remote application for comparison to a data base of biometric identification. The responses of alcohol, identification or both may be sent to a remote application. The application, data, database, or information may be hosted by a third party. The application may include one or more dashboards with one or more fields of: history, trends, analytics, or alerts. The application, data, analytics, and reports may be for one or more of: individuals, groups, company, enterprise, or industries. A remote screening system can empower the use of data to provide key decision makers with increased response capability and/or transparency into potential trends within their organizations or communities.

Referring now to FIGS. 1-17, disclosed throughout are non-invasive, alcohol detection, identity management, access control and/or alcohol screening systems and devices. The systems and devices given in the figures are for example and may alternatively or additionally have other components or features as disclosed in the specification.

FIG. 1 depicts an environmental view of an alcohol detection device 100 having a transdermal alcohol sensor 110 and a biometric scanner 120. The transdermal alcohol sensor may be configured to produce an alcohol response upon activation. The apparatus may have a housing 102. It may also have a hood 106. The device may have a light 104, power/reset switch 108, and/or indicator(s) 112. The light may include a light guide with one or more LEDs. The indicators may have position significance and/or color significance. Suitable indicators include blue, green, yellow, red, and multi-colored LEDs. Position significance or color significance may include alcohol detected, not detected, fault, ready, scanning, wait, overlimit, miss placement, system responses, peripheral connection, and others. Other indicators may include one of more haptic responses. The device may be provided with one or more anti-spoofing devices. The apparatus may be portable or of a small form factor.

Figure 2:
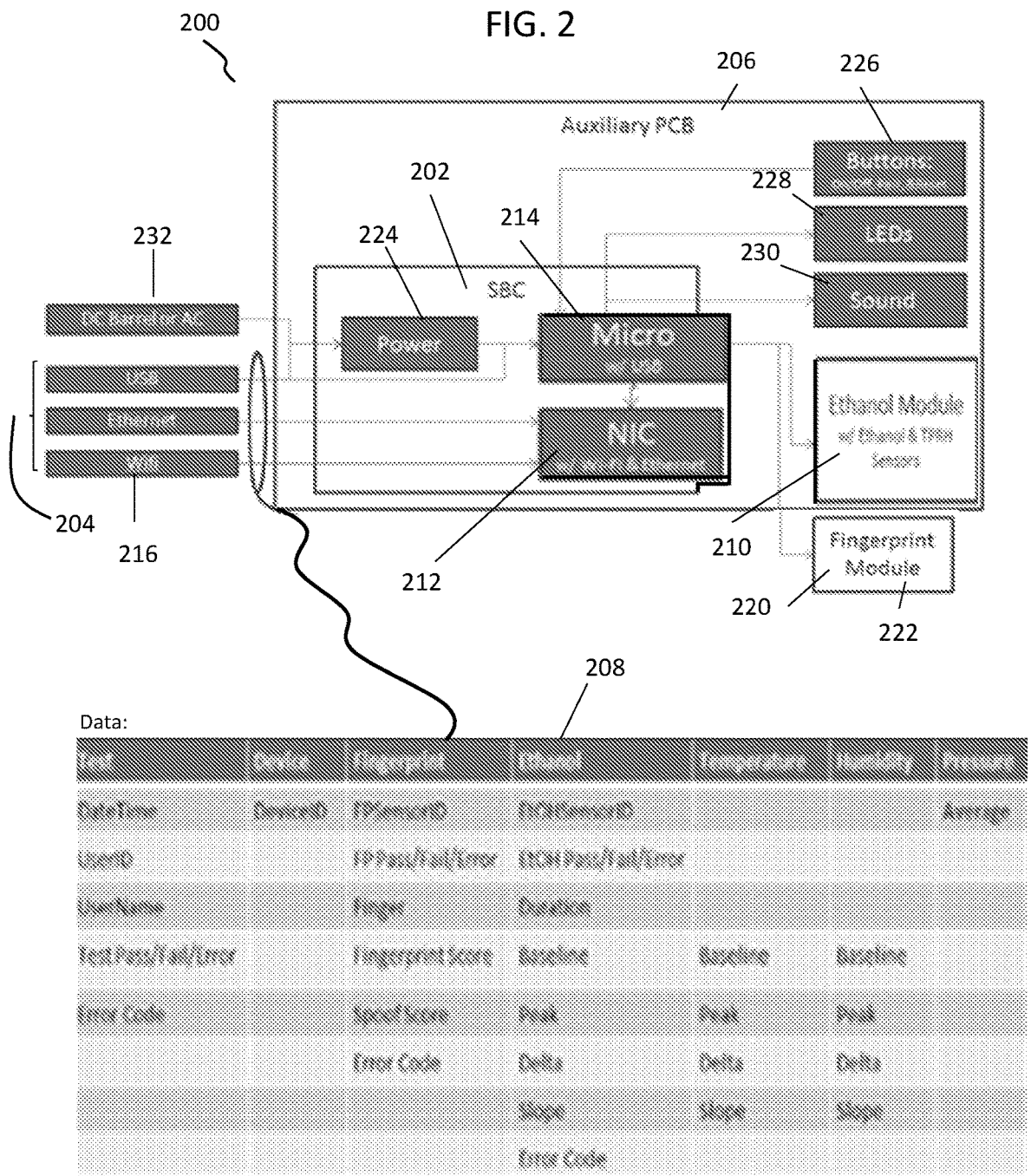
FIG. 2 is a system view of an embodiment of an apparatus having an alcohol sensor and/or biometric scanner.

FIG. 2 depicts a systems view of an apparatus 200 having an alcohol sensor module 210 and a biometric scanner module 220. As shown the biometric scanner module includes a fingerprint biometric identification module 222. The apparatus 200 may have a single board computer (SBC) 202. A single-board computer (SBC) is a complete computer built on a single circuit board, with one or more of a microprocessor(s) 214, memory, input/output (I/O) 204, network interface card (NIC) 212, and other features required of a functional computer. The SBC 202 may be a Raspberry Pie® type device. The NIC 212 may provide wired and/or wireless communications. The NIC may allow the system to connect to a network or other device through USB, ethernet, radio signals, Bluetooth®, WIFI 216, or any other suitable means of connecting 204. The apparatus 200 may also have data storage 208. Data storage 208 may include calibrations, biometric data, user authentication, error codes, device ID, temperature, pressure, humidity, sensor response, scanner response, algorithms, compensation, or any other data. The data storage 208 may be accessible to the processor or external device and may be accessible by any suitable means. The apparatus may also have one or more auxiliary printed circuit boards (PCBs) 206 or electronic modules 210, 220. The PCBs or modules may be connected to the SBC. The PCB may include buttons 226, functions, on/off, pair, reset or any other suitable function. The one or more PCB's may contain indicators, sound 230, relays, LEDs 228, power 232, power management 224, alcohol sensor module 210, biometric scanner module 220, conductive tracing, connectors, or any other suitable component. Alcohol sensing may be provided with a separate electronic module in electrical communication with the SBC processor or microcontroller. Biometric scanning may also be provided with a separate electronic module in electrical communication with an SBC processor or microcontroller.

Figure 3A:
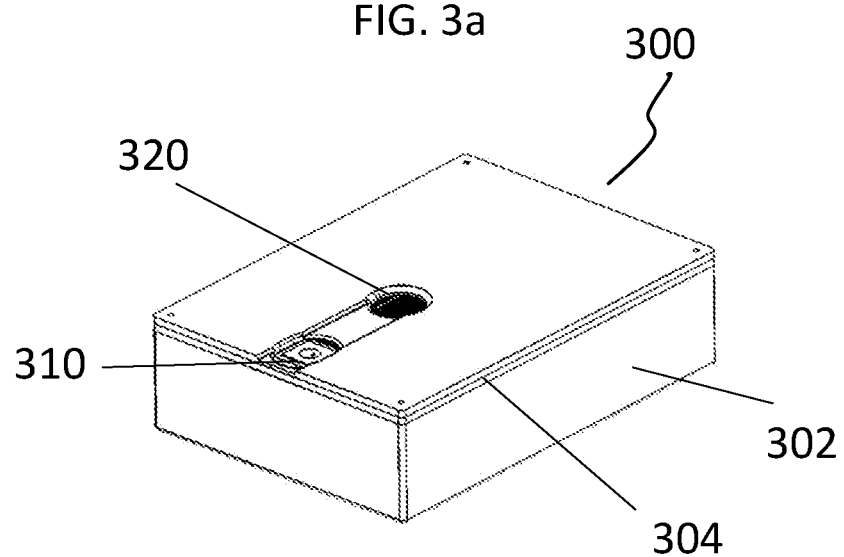
Figure 3B:
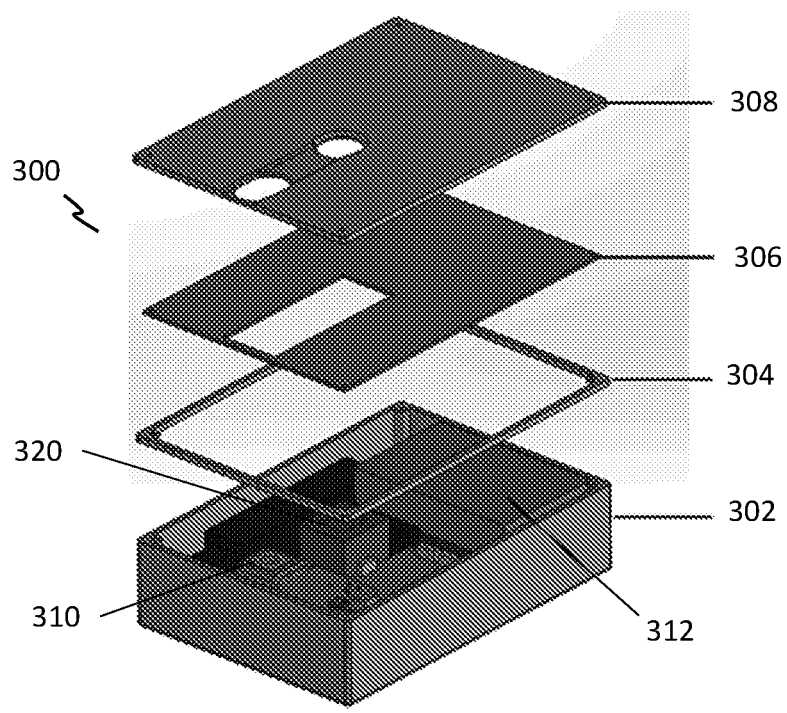

FIGS. 3a-3c show an environmental view of an apparatus 300 having an alcohol sensor module 310 and/or biometric scanner 320. The apparatus may have a housing 302, 308. The device may have lighting 304, a printed circuit board (PCB), auxiliary board 306, a single board computer (SBC) 312, USB, radio communications, power supply, and/or any other electronic components and/or features to enable the electronic components. The apparatus may be portable, have a battery to power one or more electronics, or be of a small form factor.

Figure 4:
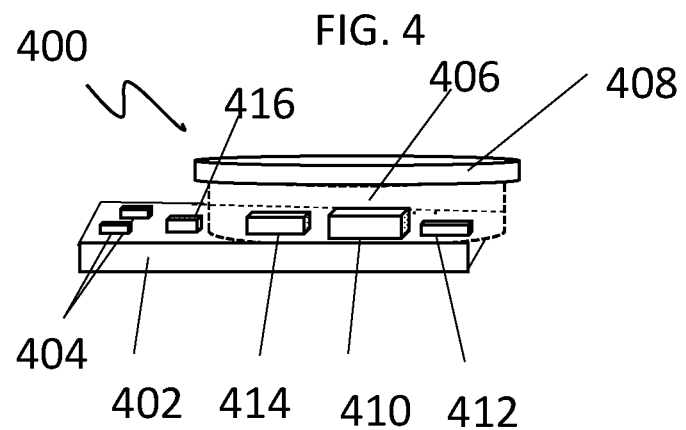
FIG. 4 is an exploded environmental view of an embodiment of an alcohol sensor with a headspace.

Referring now to FIG. 4, shown therein at 400 is an environmental view of an alcohol sensor module. The alcohol sensor module 400 may be on a main circuit board or on an auxiliary PCB. The alcohol sensor module 400 may include an electronic circuit board 402 with associated electronics 404. The alcohol sensor module 400 may include one or more of an alcohol sensor(s) 410, analogue front end, potentiostat, ADC, connector, a temperature compensator 412, a humidity compensator 414, and/or a barometric pressure compensator 416. The alcohol sensor 410 may be focused to a headspace 406. The headspace may include a seal 408. The seal 408 may be a flexible ring that can seal off the headspace upon contact with a digit, such as a finger. The headspace may provide a fixed volume for transdermal perspiration or gas vapors to accumulate about the sensor 410. The humidity compensator 414 and/or the temperature compensator 412 may be positioned in the headspace.

Figure 5A:
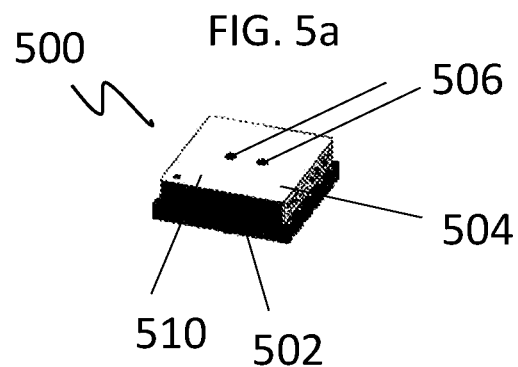
FIG. 5a is an environmental view of an embodiment of an alcohol sensor.
Figure 5B:
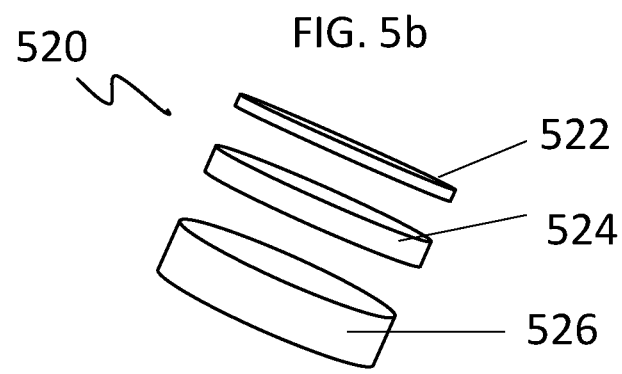
FIG. 5b is an exploded environmental view of an embodiment of an alcohol sensor.

Referring now to FIGS. 5a-5b, depicted therein at 500 is an environmental view of an alcohol gas sensor module 510 with an exploded environmental view (5b) showing the internal components of an exemplary electrochemical gas sensor assembly at 520. The sensor module 500 may include one or more of: a form factor or a PCB mount 502, an electrochemical sensor 520 having electrodes, conductors connected to the electrodes of the sensor, an outer housing 504, and one or more gas inlet pores 506 through the outer housing. The electrochemical gas sensor 520 may include one or more components including a filter stack 522, an electrode assembly 524, and an electrolyte reservoir assembly 526. The electrode assembly 524 may include at least one sensing electrode and at least one common electrode. The electrode assembly may also include a counter electrode. A suitable sensor has a reaction response time ≤20 seconds, ≤15 seconds ≤10 seconds. A suitable sensor has a recovery time ≤20 seconds, ≤15 seconds, ≤10 seconds, ≤3 seconds. The reaction time and/or recovery time may be attained without a fan or active ventilation. A reaction response time allows a test subject to test and clear the device in reasonable fashion with sufficient results. A fast reaction recovery time can allow a new test subject to start testing in a reasonable fashion without interference from a prior test subject's interaction. The sensor may cooperate with a headspace volume to clear in ≤20 seconds, ≤15 seconds, ≤10 seconds, and ≤3 seconds.

Figure 6A:
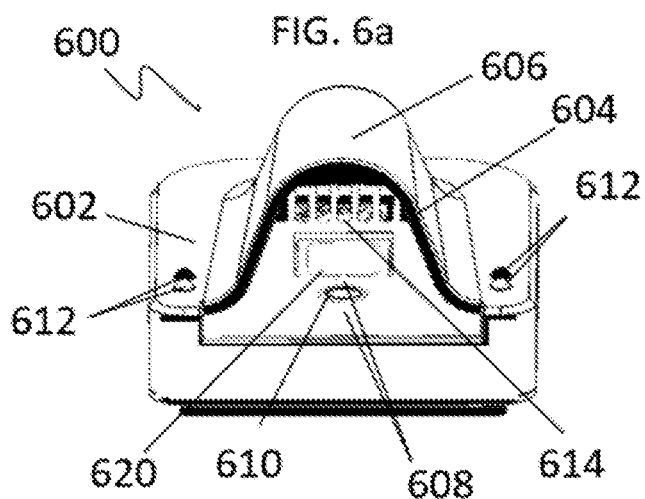
FIGS. 6a-6b are environmental views of an embodiment of an apparatus having an alcohol sensor and/or biometric scanner.
Figure 6B:
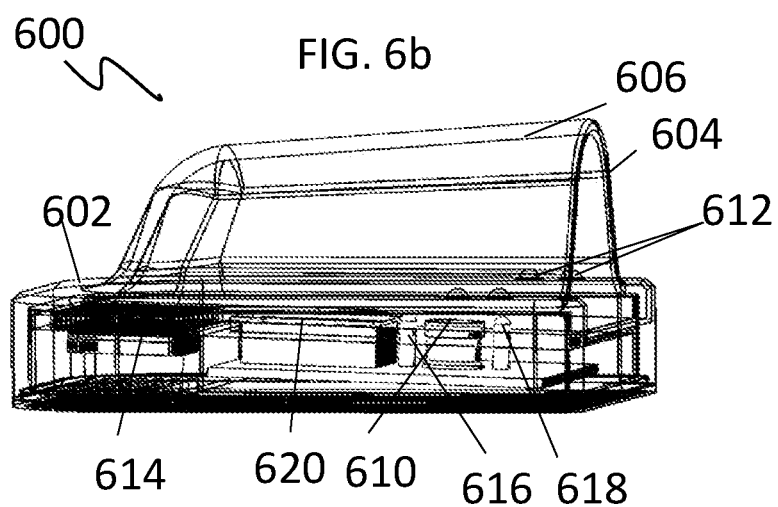

FIGS. 6a-6b shows an environmental view of an apparatus 600 having one or more non-invasive, alcohol sensors 610 and/or a biometric scanner 620. The apparatus may have a housing 602. It may also have a hood 606. The device may have lighting 604, a power or activation switch, and/or indicator(s) 612. The apparatus may have active ventilation 614. The apparatus may have a guide 608 for guiding a digit to proper position along the sensor and scanner and/or aid in activating the device.

The one or more non-invasive, alcohol sensors 610 may be configured to produce an alcohol response upon activation. A single alcohol sensor or any number of like kind or different sensors may be used. The one or more alcohol sensors may be a transdermal alcohol sensor or a subdermal alcohol sensor.

The biometric identification scanner 620 maybe one or more of a fingerprint scanner or finger vein scanner. The scanner may sit sub-flush to the surface of the apparatus. The biometric identification scanner may evaluate any one or more of the internal and/or external surface points on a person's finger or thumb ridges, valleys, or veins to authenticate the identification of a subject.

The guide 608 may be a tactile indicator, a switch, a series of contact points or any other suitable device. The guide may be positioned along multiple points over the surface of the apparatus and may be aligned from the point of test subject approach to the sensor/scanner target location.

The apparatus may include one or more touch sensors 616, 618. The touch sensor(s) 616, 618 may be configured to detect the presence of a digit in proximity to the alcohol sensor or biometric identification sensor. The touch sensors may be pressure sensors, switches, capacitive sensors, or any other suitable device. The touch sensors may ensure compliance with the positioning of the test subject about a target location and may be used to ensure proper data gathering for the duration of a test or scan.

The lighting 604 may be a light source, a light bar, one or more LEDs, an LED light strip, fiber optics, or any other suitable lighting device. The lighting may illuminate the outside edges of the apparatus, the access port, the inside of the apparatus, the outside of the testing apparatus, the sensor, the scanner, or any other suitable area. The lighting may be for ambient lighting, to indicate status, as a visual aid or for any other suitable use.

The indicators 612 may be individual colored LEDs, segmented LED panel, an LCD screen, or any other suitable indicator. The indicators may be used to indicate one or more of: status, ready, wait, pass/fail, go/no go, fault, network status, cleaning, sanitizing, or any other suitable communication. The indicators may be placed on different sides of the apparatus. Indicators placed on different sides may be assigned different indications. For example, indicators closest to the sensor may indicated responses for the sensor and indicators closest to the scanner may indicate for the scanner.

In practice a subject can place a digit, such as a finger, into the hooded apparatus 600 along the guide 608 adjacent the alcohol sensor, and adjacent the identification scanner. The scanner may be activated by the touch sensors. The alcohol sensor may have power but be in a standby mode. Activation of the scanner or touch sensors may wake the electronics to initiate an alcohol detection algorithm. The biometric identification scanner produces an identification response to authentic the user or collect biometric identification data. The transdermal alcohol sensor produces an alcohol response proximate in time to the scanning. The device can then generate a pass-fail response from the alcohol response. The alcohol response may then be paired with the identification response. The pass-fail response can then be reported locally or remotely. The pass/fail response can be used for access control to a location, for a device, for machinery, law enforcement, emergency response, or for any other suitable use. The apparatus may be portable or of a small form factor.

Figure 7A:
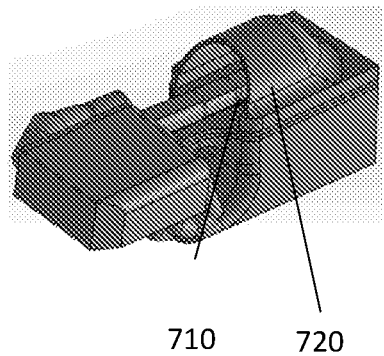
FIGS. 7a-7b are environmental views of an embodiment of an apparatus having an alcohol sensor and/or biometric scanner.
Figure 7B:
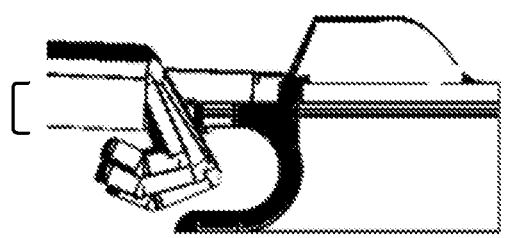

FIGS. 7a-7b depict an environmental view of an apparatus 700 having an alcohol sensor 710 and a biometric scanner 720.

Figure 8:
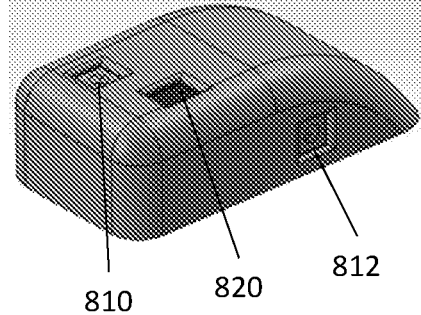
FIG. 8 is an environmental view of an embodiment of an apparatus having an alcohol sensor and/or biometric scanner.

FIG. 8 shows an environmental view of an apparatus 800 having a plurality of sensors 810, 812 and a biometric scanner 820. The apparatus may be portable, have a battery to power one or more electronics, or be of a small form factor. The sensors may be the same or different. The sensors may be for alcohol detection, cross interference detection, environment compensation, or other compensation. The sensors may have different sensitivity to alcohol. The multiple sensors may be used to validate the accuracy of the alcohol response.

Figure 9:
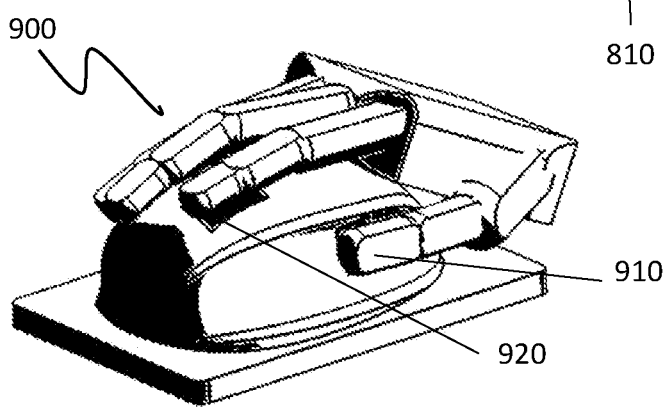
FIG. 9 is an environmental view of an embodiment of an apparatus having an alcohol sensor and/or biometric scanner.

FIG. 9 shows an environmental view of another embodiment of an apparatus 900 having an alcohol sensor 910 and a biometric scanner 920.

Figure 10:
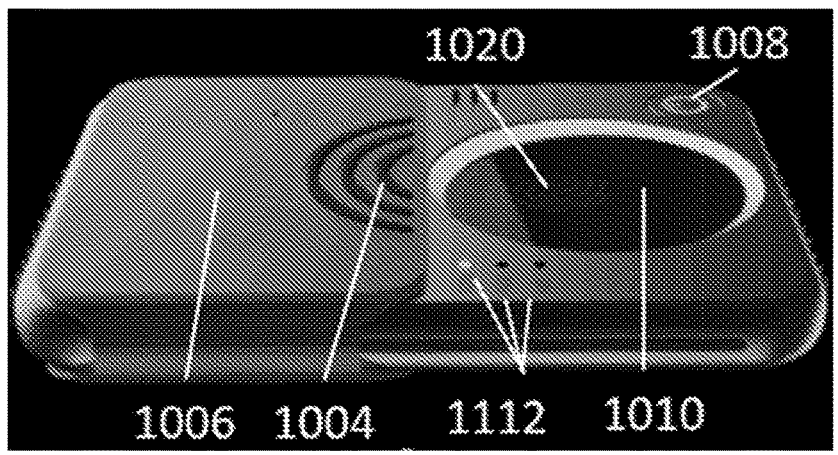
FIG. 10 is an environmental view of an embodiment of an apparatus having an alcohol sensor and/or biometric scanner.

FIG. 10 shows an environmental view of another embodiment of an apparatus 1000 having an alcohol sensor 1010 and/or a biometric scanner 1020 and a cover 1002. The cover 1002 may be a slide cover. The apparatus as show supports both the sensor and the scanner. The cover may be attached to the apparatus and may cover both the sensor and scanner in application. The cover 1002 may have tactile assistance 1004. As shown the device has a power function 1008. The apparatus has one or more indicators 1112. The indicators may be placed on the apparatus and may indicate a result obtained from the alcohol sensor. The result may be abstract, go/no go, or any other suitable indication. The apparatus may be portable, have a battery to power one or more of the sensors or other electronics. The apparatus may be of a small form factor. The cover may protect both the sensor and scanner.

Figure 11:
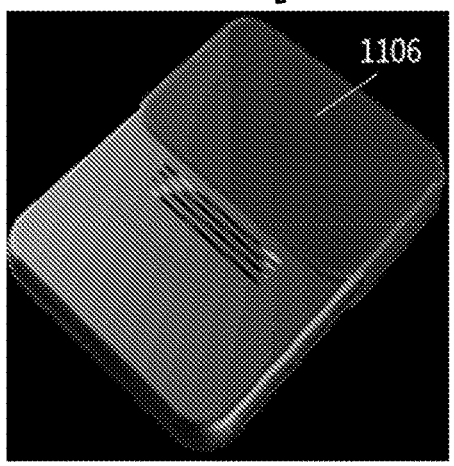
FIG. 11 is an environmental view of an embodiment of an apparatus having an alcohol sensor and/or biometric scanner.

FIG. 11 shows an environmental view of another embodiment of an apparatus 1100 having an alcohol sensor (covered, not shown), biometric scanner (covered, not shown), and a cover 1106. The sensor and scanner are supported by the apparatus and may reside under the same cover 1106. As shown the cover 1106 is in the closed position. In the closed condition the cover may protect the sensor and scanner. The cover may also cover one or more indicators, see FIG. 10 element 1112 for an example. The apparatus may be portable or of a small form factor. The apparatus may be portable, have a battery to power the one or more of the sensors or have other electronics.

Figure 12:
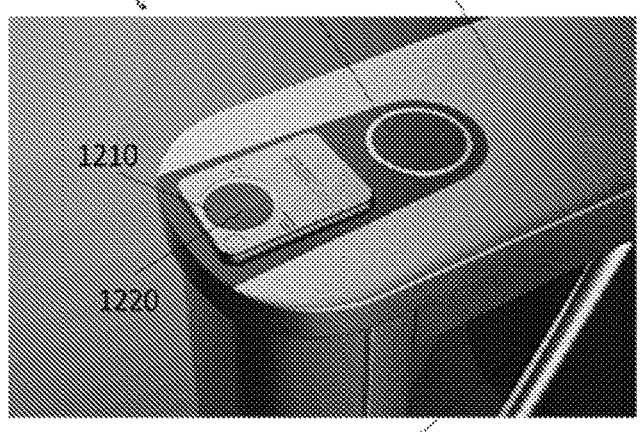
FIG. 12 is an environmental view of an access control system having an alcohol sensor and/or biometric scanner.

FIG. 12 shows an environmental view of an access control system 1200. As shown the access control system 1200 has an alcohol sensor 1210 and/or a biometric scanner 1220. The access control system may have an access control device 1202. The access control device 1202 may include any suitable means for controlling access. Suitable access control devices include gates, turnstiles, switches, equipment, ignition, locks, and doors. As shown the access control system includes a turnstile 1204. The access control may also have an indicator 1206. The indicator may provide a go/no go indication or any other suitable indication.

Figure 13A:
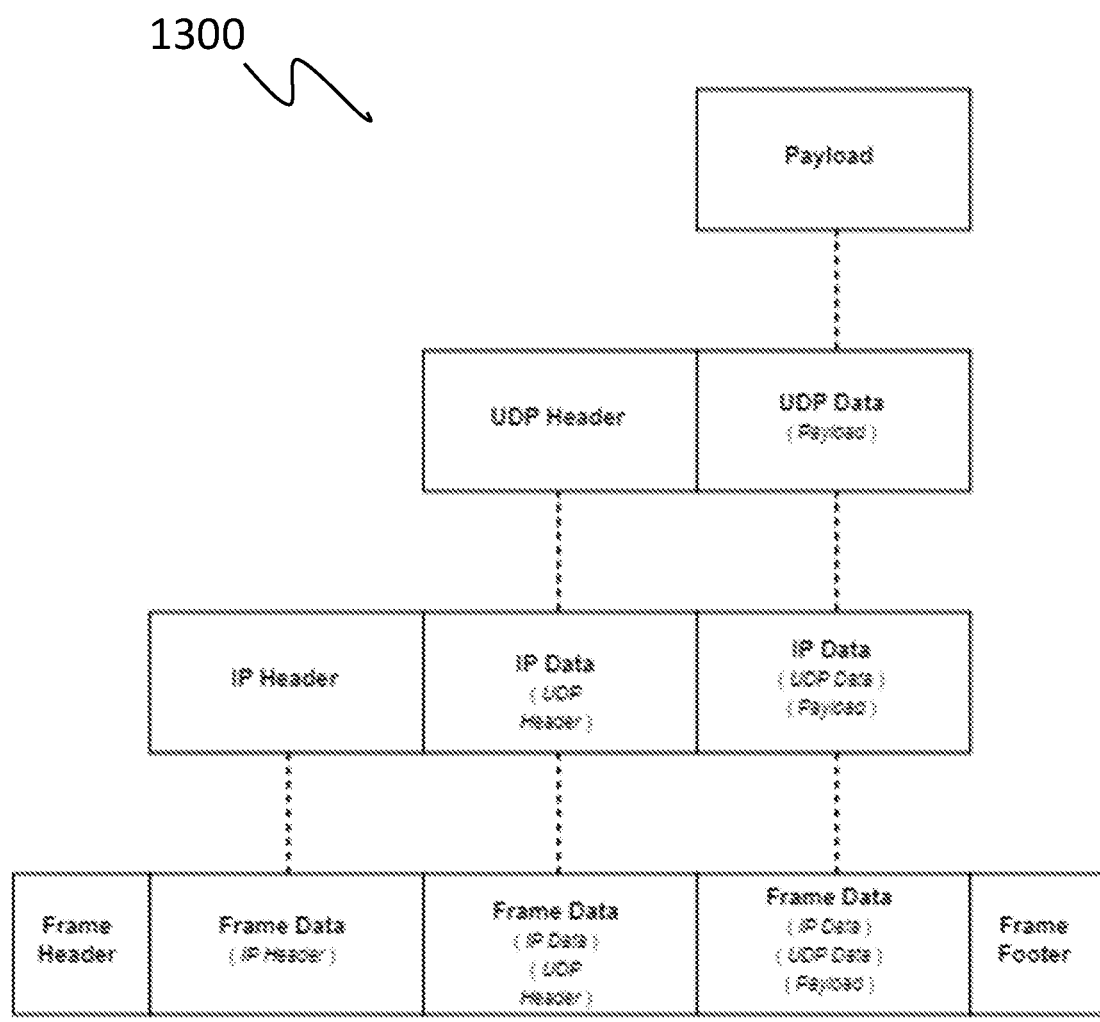
FIG. 13a-13b are system diagrams showing an embodiment of a system at least in part.
Figure 13B:
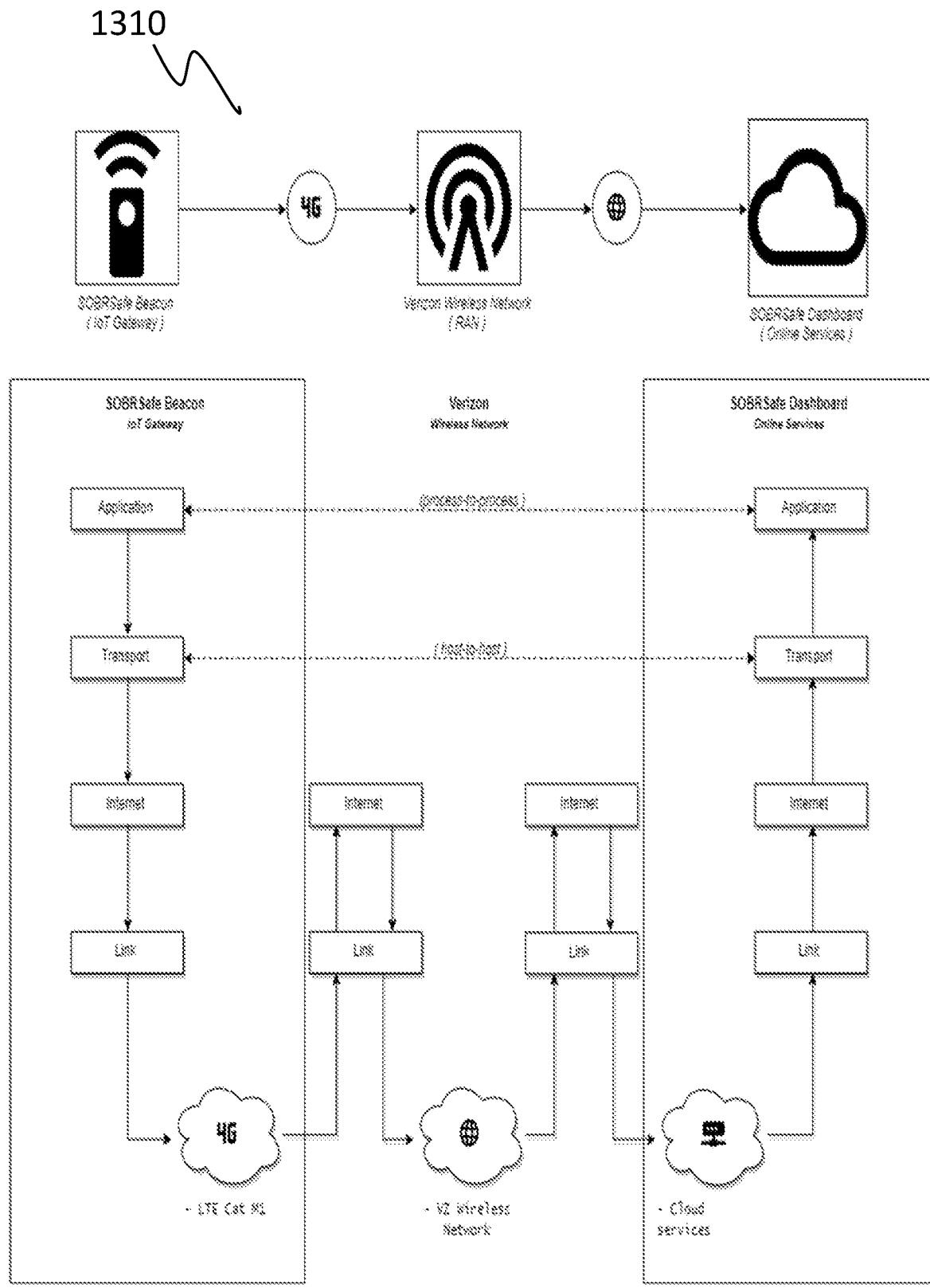

FIG. 13a-13b depicts an example system diagram 1300 showing an embodiment including a telemetry system 1310. The telemetry system may include one or more of: an alcohol sensor, access control, primary user authentication, secondary user authentication, biometric identification, RFID, pass code, communications, applications, graphical user interfaces, client services, network access, cloud services, application front end, application back end, database, data storage, data libraries, 3$^{rd}$ party applications, analytics, dashboard services or any other useful system feature. The telemetry system may function through one or more of wireless networks, wired networks, phone systems, WiFi, Bluetooth® or other suitable systems. The telemetry system my use or integrate with one or more commercial cloud services for data storage, analytics, artificial intelligence, or any other service. A suitable telemetry system will connect with a user and report data remotely. The application may be used for business workers, commercial drivers, law enforcement, emergency response or any other suitable use. In a commercial driver application, a driver may scan in on the system one or more times during a day. The initial scan may determine if an operator receives keys to a vehicle, access to facilities, or access to equipment. Follow-up scans may be used to evaluate on going activity. In a public use application, the operator may scan a subject's biometrics for identification and test for the presence of alcohol. The application may be performed on one or more of cooperative subjects, uncooperative subjects, unconscious subjects, and deceased subjects.

Figure 14:
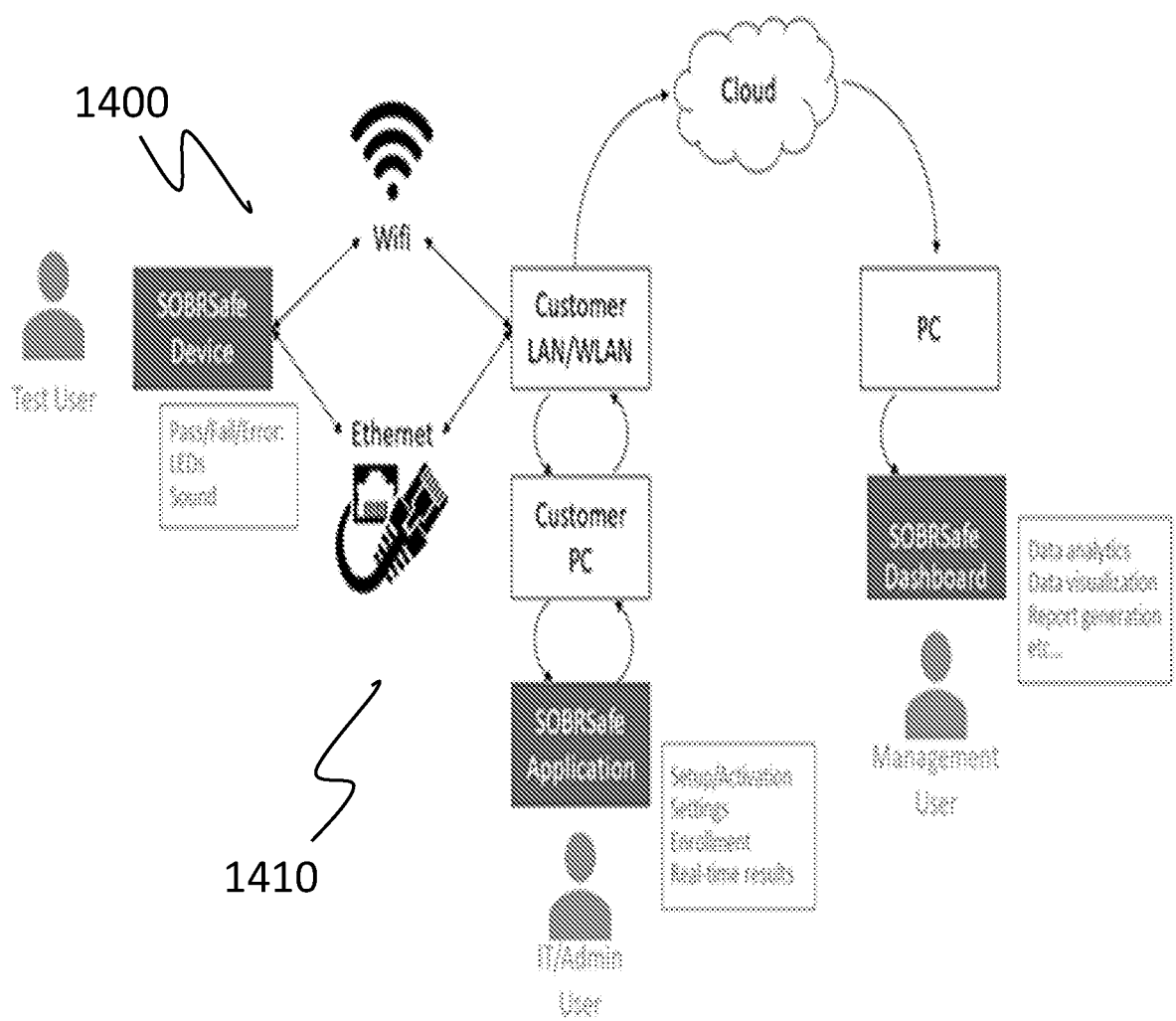
FIG. 14 is system diagram showing an embodiment of a system at least in part.

FIG. 14 shows a system diagram in accordance with an embodiment of a screening system 1400 with remote reporting 1410. The screening system includes one or more of: a test device, network communications, administration portal, cloud applications, analytics, cloud storage, client user interface. The system may include one or more applications for user activation, settings, enrollment, or real time results. The system may also include a client dashboard. The client dashboard may provide for data analytics, data visualization, report generation, user monitoring, or any other suitable dashboard feature.

Figure 15:
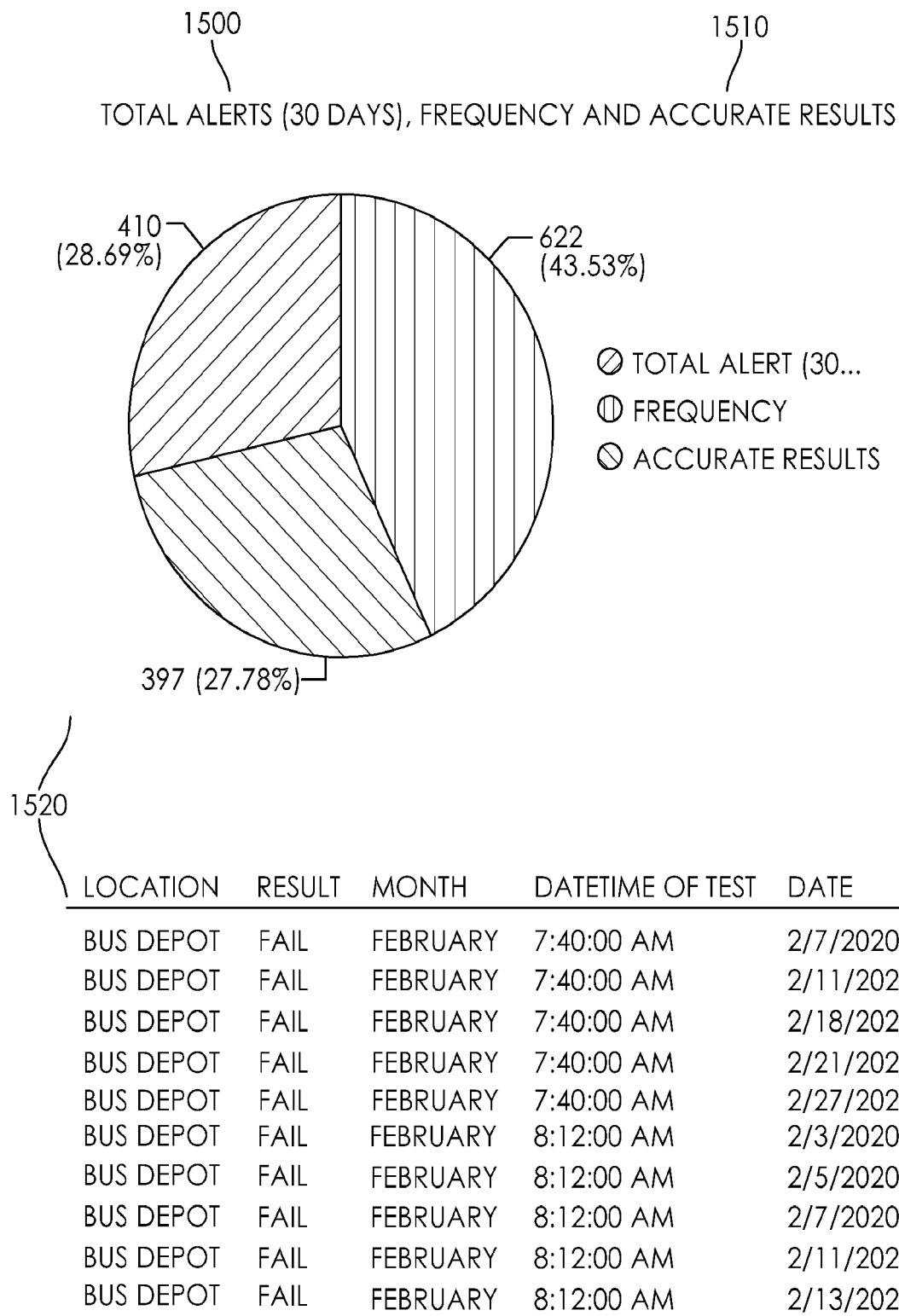
FIG. 15 is visual of an embodiment of a system at least in part.
Figure 15:
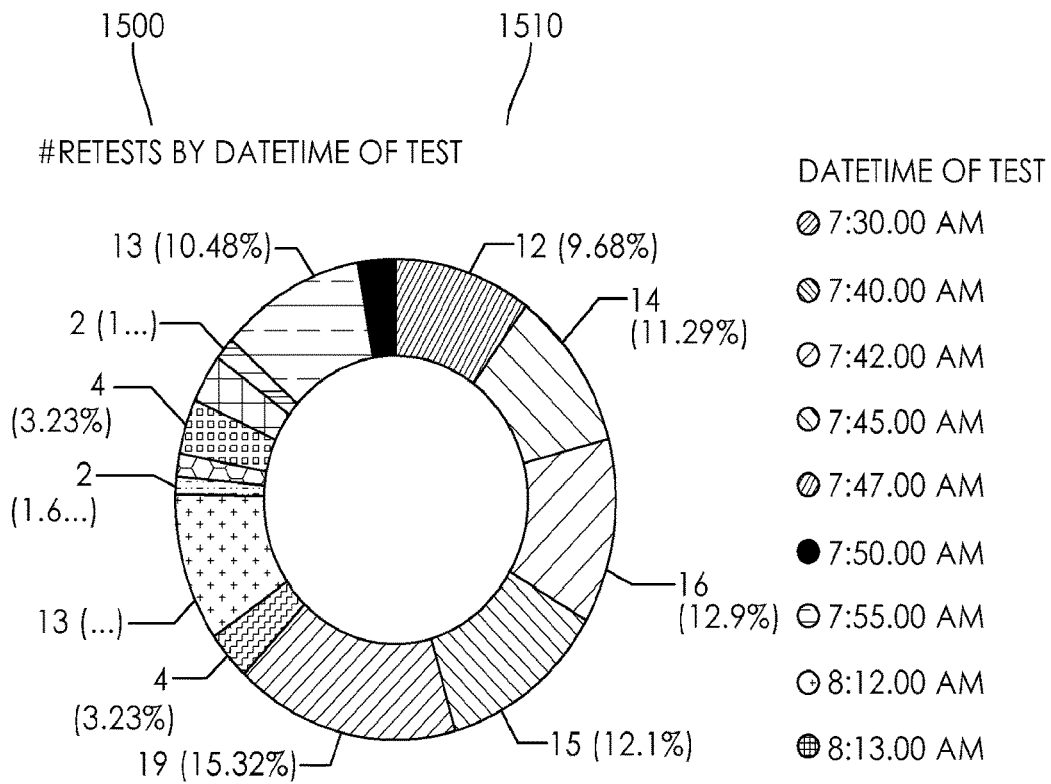
Figure 15:
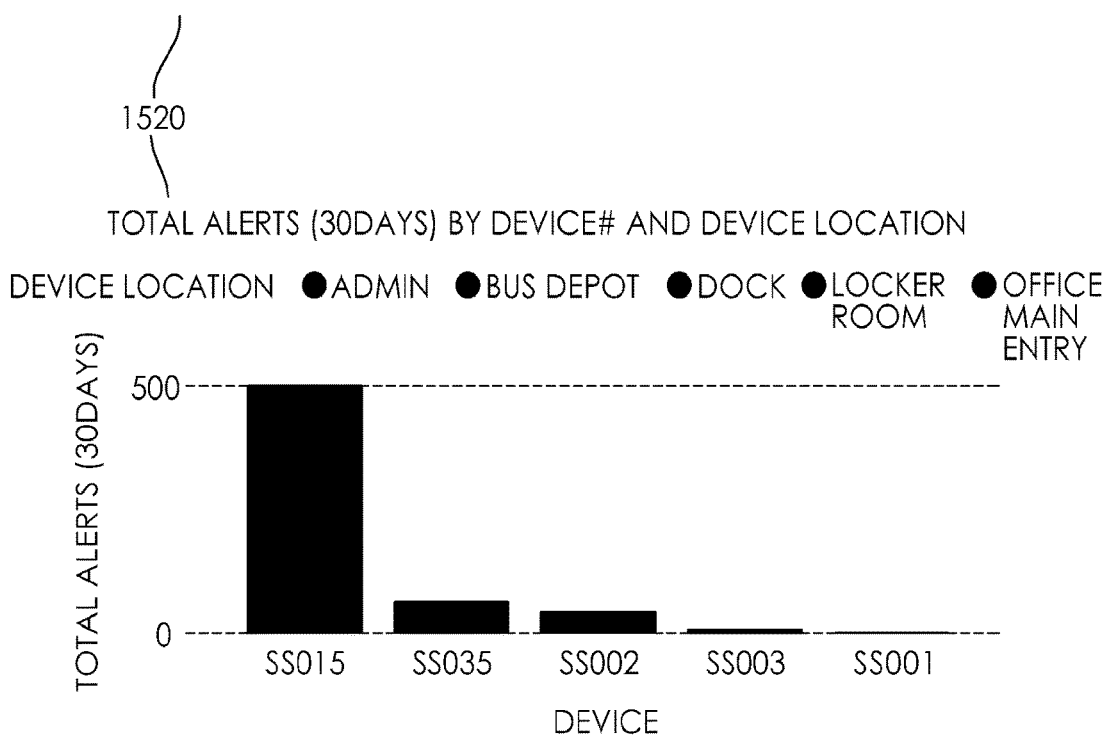

FIG. 15 depicts a screening or reporting system 1500. As shown in FIG. 15 the screening system 1500 includes a dashboard 1510. The dashboard 1510 include one or more fields 1520 of history, trends, analytics, or alerts for one or more of individuals, groups, or whole company.

Figure 16A:
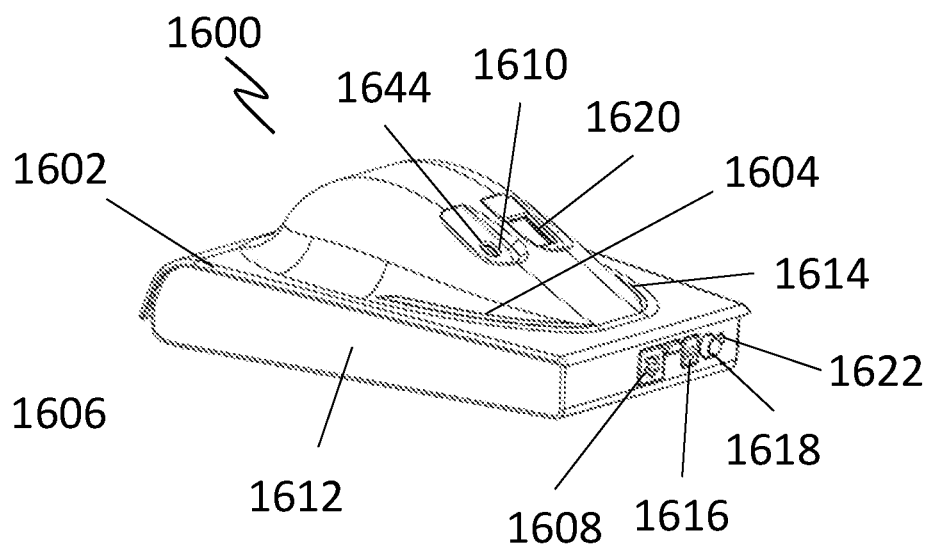
FIG. 16a-16b are environmental views of an embodiment of an apparatus having an alcohol sensor and/or biometric scanner with one drawing exploded.
Figure 16B:
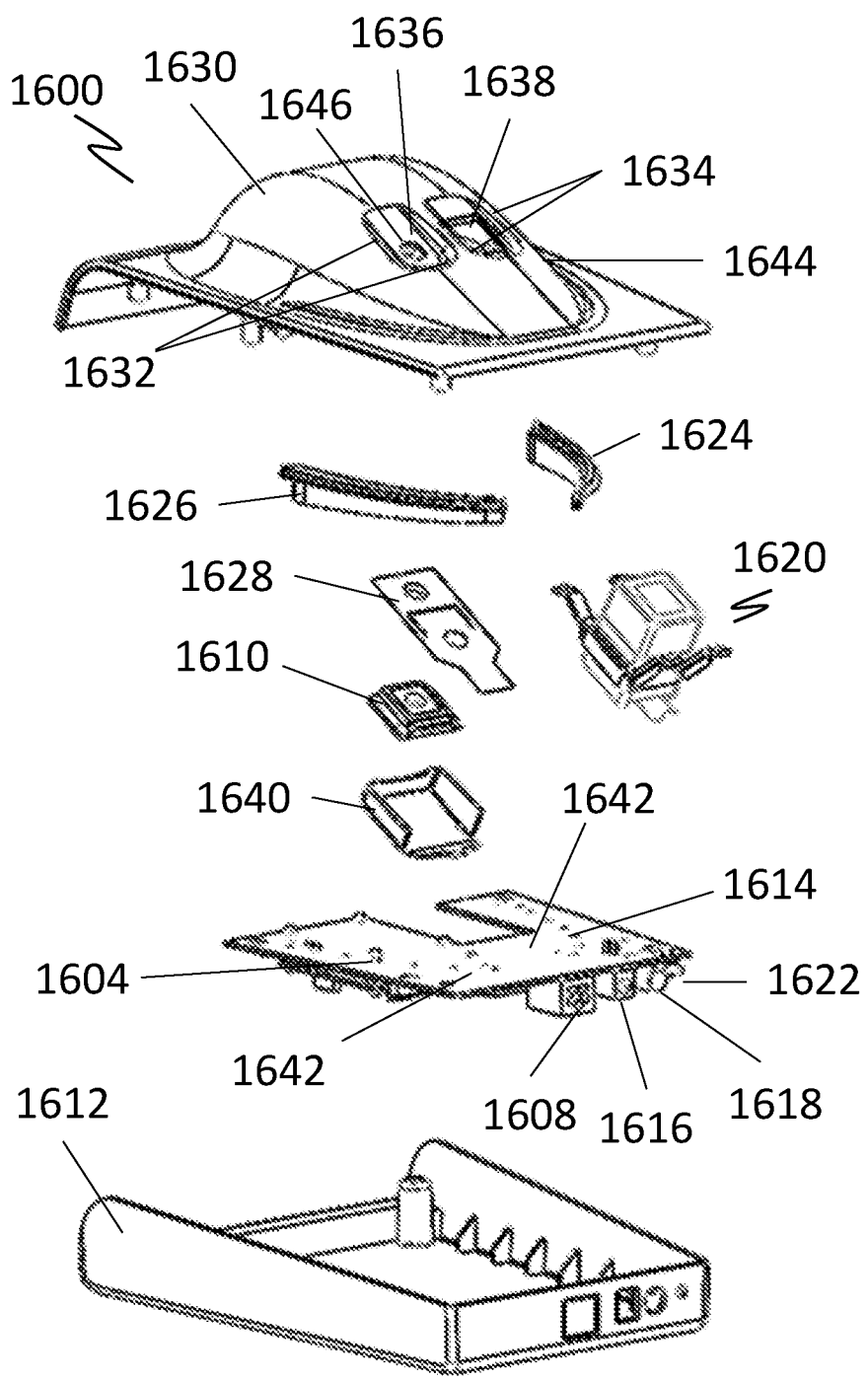

Referring now to FIGS. 16a-16b, depicted therein is an environmental view of an embodiment of an alcohol detection system 1600 having an alcohol sensor module 1610 and/or biometric scanner module 1620. The apparatus may have a housing 1602 with an alcohol sensor opening 1644. The apparatus may have a base 1612. The sensor opening 1644 may have a screen or filter 1646.

The alcohol detection system 1600 may have one or more system indicators 1604, 1614. The system indicators may include a series or LEDs and light guides 1626, 1624. The indicators may indicate together or separately. For example, one side may indicate for alcohol response, the other may indicate for the scanner. The indicators may indicate together for readiness, delay, fault, or any other response.

The alcohol detection system 1600 may include firmware, software, algorithm, and electronics sufficient for operation. Electronics may include printed circuit board 1642, auxiliary boards, data cables, microprocessor, ASICs, modules, ICs, conductors, connectors, memory, network interface card, serial data port, wireless communication, power management, network communication port 1608, power adapter 1616, power switch 1618, and/or system reset 1622. The firmware and algorithm(s) may reside on onboard memory integrated with a microprocessor.

The alcohol detection system 1600 may include one or more anti-spoof devices. The alcohol detection system 1600 may include one or more touch sensors 1628. The touch sensor(s)1628 may be configured to detect the presence of a digit in proximity to the alcohol sensor or biometric identification sensor. The touch sensor may check that a digit has been properly placed at the alcohol sensor before indicating an alcohol response. In the case where a digit is not properly detected the system may generate a fault or other indication through one or more means. The one or more means may be through the LED indicators or haptic feedback. The indicator may be the one closest to the sensor or on the sensor side of the apparatus. The touch sensors may operate as one or more of the anti-spoof devices.

The alcohol sensor module 1610 may include an electronic circuit board with associated electronics. The alcohol sensor module may include one or more of an alcohol sensor(s), an analogue front end, a potentiostat, an analogue to digital converter, connector(s), voltage divider, voltage bias, temperature compensator, humidity compensator, and/or barometric pressure compensator. Suitable temperature, humidity and pressure sensors may be provided by one or more micro-electromechanical systems (MEMS) devices. As configured the device is presented as a multiuser, digit testing apparatus with a gas headspace 1640.

The alcohol sensor may be focused about the headspace 1640. The headspace 1640 may include a seal. The seal may be a flexible ring, foam or other suitable material that can seal off the headspace upon placement of a digit. The headspace may provide a controlled volume of transdermal perspiration or gas vapors to the sensor. The humidity compensator, the temperature compensator and/or pressure compensator may also be positioned in the headspace. The headspace may have an inside and an outside and form an essentially fixed space of a predetermined volume on the inside. The outside may be configured to seat at least one finger or thumb in a conforming mold.

The apparatus may be configured to simultaneously seat at least 2 digits of a test subject at the same time in a conforming mold 1644. As shown, the testing apparatus may have one or more of: a base 1612, a palm support 1630, one or more digit guides 1632, 1634, one or more digit supports 1636 for alcohol sensing, and one or more digit supports 1638 for identification. The digit supports 1636, 1638 may be recessed relative to the digit guides 1632, 1634. A recess may increase in depth along the length of the digit guide(s). The palm support 1630 may be angled, convex or cupped to conform generally to a cupped palm or a relaxed hand of a test subject. The one or more digit supports 1636, 1638 may be angled relative to the base. The angel may be ≥5 degrees, ≥10 degrees, ≥20 degrees or more. The angle may be downward toward the base. The angel of the recesses may increase at a rate greater than the surface of the palm support. The size, configuration and features of the housing, base, palm support, digit guides, and/or digit supports cooperate to guide a test subject hand and digits into a suitable detection position about the alcohol sensor, the identification scanner, and/or both. The guides may also be configured to allow a more natural and/or intuitive positioning with reduced hand strain from a flat test platform with less sensor or scanner misreads.

Figure 17A:
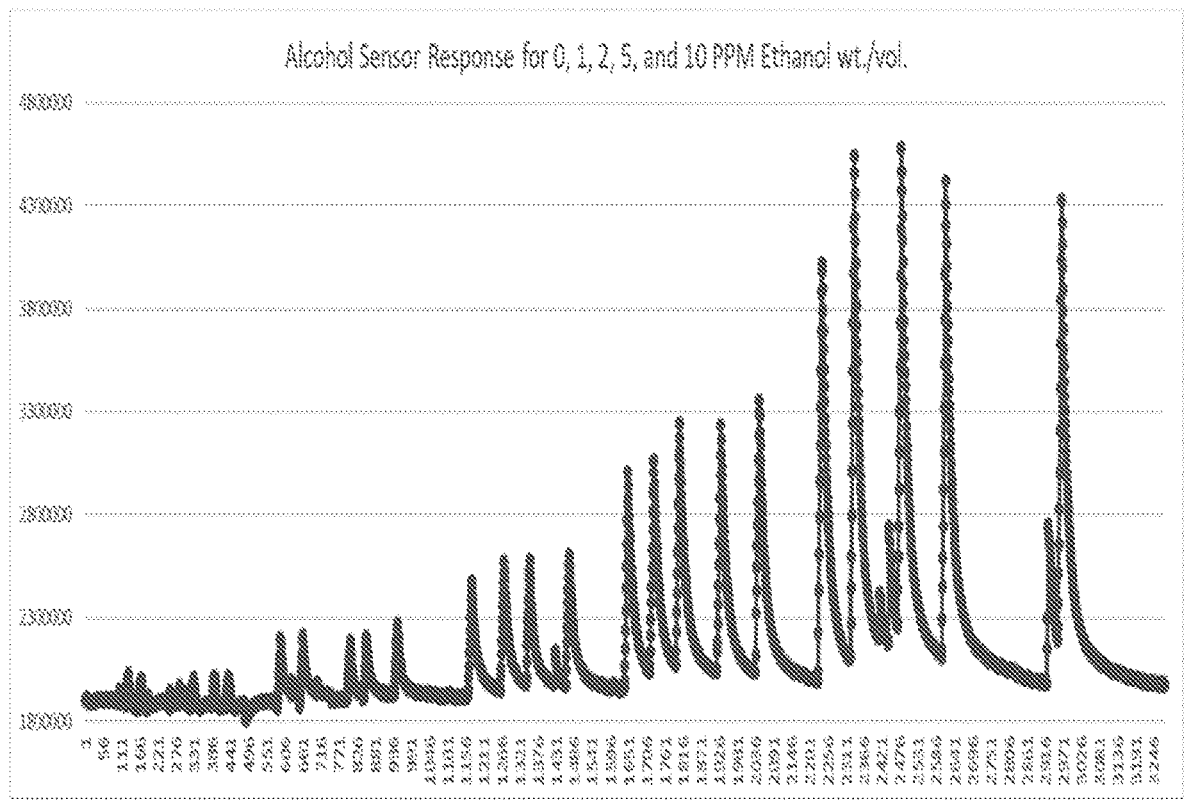
FIGS. 17a-17d are visual of results produced in accordance with embodiments having an alcohol sensor and/or biometric scanner with a 1 second interval data acquisition.
Figure 17B:
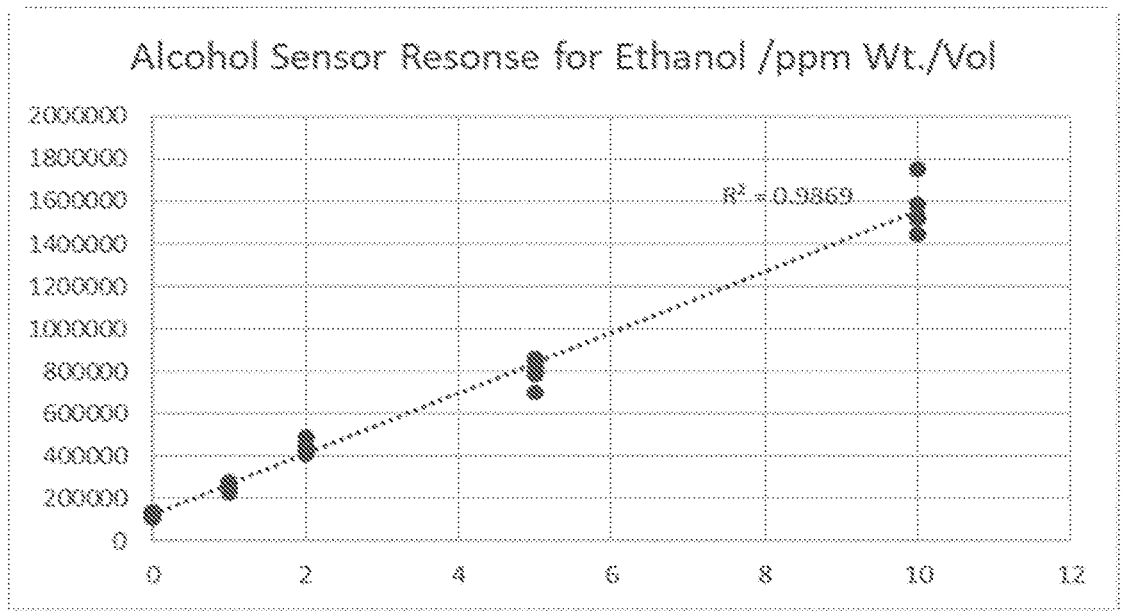
Figure 17C:
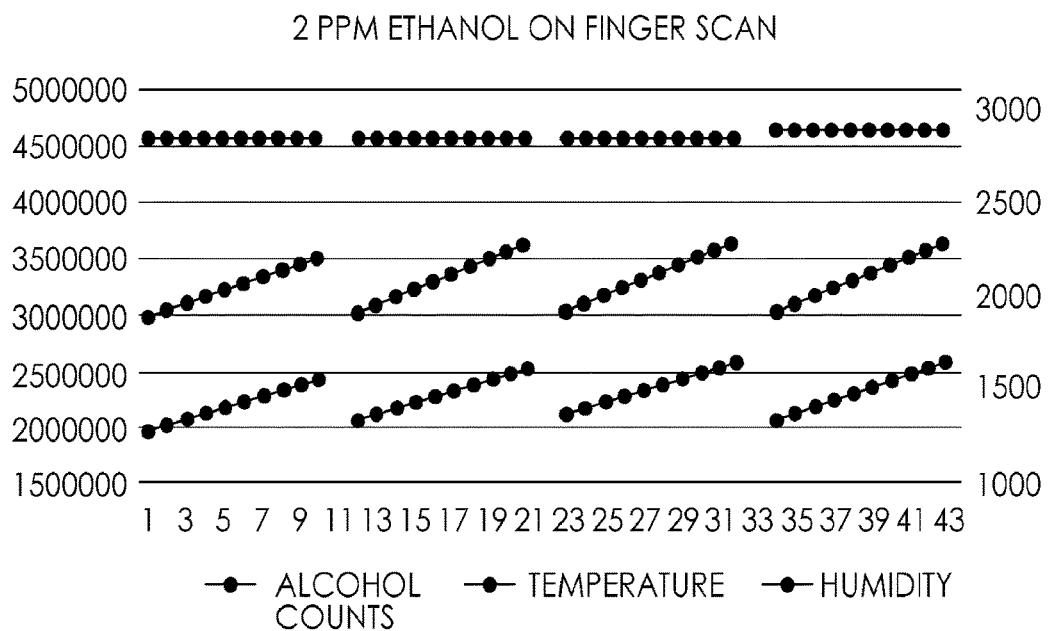
Figure 17D:
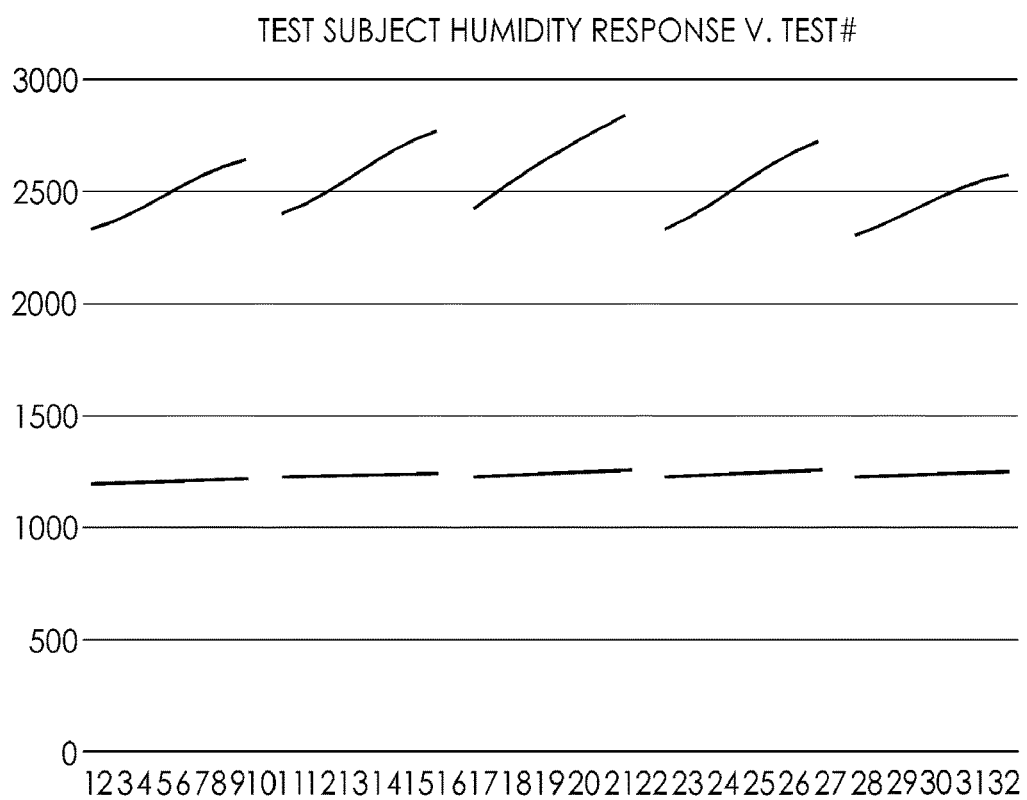

FIGS. 17a-17d depicts testing results produced in accordance with a device as disclosed in 16a-16b. The data is presented as a response of counts at 1 second intervals. 17a-17b shows response of alcohol solutions of 0, 1, 2, 5, and 10 ppm ethanol solutions. FIG. 17b shows the linearity of alcohol response captured over the range of 0 ppm to 10 ppm with multiple sampling at each concentration. FIG. 17c shows signal data for a 2 ppm ethanol solution captured with corresponding temperature and humidity data. FIG. 17d shows skin humidity response compared to a humidity response when the skin of a test subject is obscured from the alcohol sensor for 4 different samples at each condition. The humidity response may be used as an indication of a spoofing attempt at the alcohol sensor or proper placement of a digit by a test subject. The apparatus may be made to alert when an improper humidity response profile is detected.

In practice the alcohol detection system may be used to monitor the presence of transdermal alcohol in multiple users or subjects. The biometric identification scanner may have pattern recognition and can be configured for biometric identification. While the method of monitoring may vary, a suitable method includes: scanning biometric identification information with the biometric identification scanner upon a presentation of one or more digits to the testing apparatus to generate identification data. The shape of the housing or test apparatus guides the digits into a proper detection position. The system can check the one or more digits for transdermal alcohol and acquire a transdermal alcohol response. The alcohol response may be determined proximate in time with the scanning of biometric identification information. The response may be equated with a binary detection, a detection range, or a go/no-go result. The result may be reported locally, or the result may be paired with the identification data and transmitted to a remote application or both.

As may be appreciated from this disclosure there is provided a noninvasive transdermal alcohol screening system(s), testing device(s), access control, and method(s). Device performance or operation can be measured over a temperature range of 15° C. to 30° C. and a more narrow temperature range of 20° C. to 27° C. Also disclosed herein are embodiments of noninvasive, transdermal alcohol screening systems, devices, access control and methods that have one or more novel features as presented in the embodiments, claims and the drawings attached which features may be combined in total or substituted individually. While the invention(s) has been illustrated in the foregoing description, the same is to be considered as illustrative and not restrictive in character. For example, the system of the present invention may be adapted for other uses with only slight or no modifications to the invention hereof. Therefore, only the preferred embodiments have been shown and described fully and that all changes and modifications that come within the spirit and scope of the claimed invention are desired to be protected.

What is claimed is:

1. An alcohol detection device configured as a digit testing apparatus for monitoring transdermal alcohol of a human subject comprising:
 a gas headspace selectively closed by contact with the human subject's skin, wherein the gas headspace is a fixed space having a predetermined volume within the alcohol detection device and is selectively closed by seating one of the human subject's digits in a conforming mold;
 an alcohol sensor exposed to the gas headspace to detect the presence of a target analyte within perspiration from the human subject's skin into the gas headspace;
 a biometric identification scanner to identify the human subject using one or both of internal and external surface points on the human subject's body; and
 a processor configured to correlate the detected target analyte with transdermal alcohol of the human subject and pair the correlated transdermal alcohol with the identification of the human subject.

2. The alcohol detection device of claim 1, wherein the target analyte is ethanol.

3. The alcohol detection device of claim 1, wherein the biometric identification scanner utilizes pattern recognition to identify the human subject.

4. The alcohol detection device of claim 1, the processor further configured to provide a binary response the correlation of the detected target analyte to the transdermal alcohol of the human subject.

5. The alcohol detection device of claim 1, further comprising:
 one or more indicators that communicate one or more of: device status, pass/fail response, go/no go fault, network status, analyte overload, and testing time delay.

6. The alcohol detection device of claim 2, wherein the alcohol sensor is an electrochemical, amperometric sensor, the processor further configured to correlate alcohol consumption by the human subject when the alcohol sensor detects between 1 ppm w/v ethanol/water and 8 ppm w/v ethanol/water.

7. The alcohol detection device of claim 2, the processor further configured to provide an analyte overload response when the alcohol sensor detects 40 ppm w/v ethanol/water or greater.

8. The alcohol detection device of claim 1, the processor further configured to provide a testing time delay after correlating the detected target analyte with the alcohol consumption by the human subject before testing another human subject.

9. The alcohol detection device of claim 1, further comprising:
 a humidity sensor system exposed to the gas headspace to sense a change in humidity of the gas headspace to infer closure of the gas headspace by contact with the human subject's skin.

10. The alcohol detection device of claim 1, wherein a response from the alcohol sensor includes a baseline signal that floats over a signal range, and correlation of the detected target analyte with transdermal alcohol of the human subject includes a rate of change of the baseline signal.

11. The alcohol detection device of claim 1,
 wherein the conforming mold is configured to simultaneously seat a first digit of the human subject in a first digit guide and a second digit of the human subject in a second digit guide, wherein the first digit guide opens to the gas headspace and the second digit guide opens to the biometric identification scanner.

12. The alcohol detection device of claim 1, wherein the alcohol sensor has a reaction response time <15 seconds.

13. The alcohol detection device of claim 1, further comprising:
 a wireless radio wave network communication module to receive information from the alcohol sensor, and communicate the information to another digital device.

14. The alcohol detection device of claim 1, further comprising:
 a touch sensor to detect the presence of one of the human subject's digits in proximity to the alcohol sensor.

15. The alcohol detection device of claim 1, wherein the confirming mold includes:
 a base;
 a convex palm support surface to conform with a cupped palm of the human subject;

a digit guide; and a digit support that is recessed relative to the digit guide.

16. A method for monitoring transdermal alcohol of a human subject using an alcohol detection device, the method comprising:

identifying the human subject by scanning one or both of internal and external surface points on the human subject's body using a biometric identification scanner;

closing a gas headspace within the alcohol detection device by seating one of the human subject's digits in a conforming mold;

detecting the presence of a target analyte within perspiration from the human subject's skin into the gas headspace using an alcohol sensor, and correlating the detected target analyte with transdermal alcohol of the human subject using a processor; and pairing the correlated transdermal alcohol with the identification of the human subject using the processor.

17. The method of claim 16, wherein:

the identifying the human subject is in response to presentation of one of the human subject's digits to the biometric identification scanner;

the identifying the human subject is further proximate in time with the detecting the presence of the target analyte; and the detecting the presence of the target analyte is in response to the closing of the gas headspace.

18. The method of claim 16, wherein the identifying the human subject includes authenticating a scan of the human subject's body with biometric identification information retrieved from a local data source.

19. An alcohol detection device for monitoring alcohol consumption by a human subject comprising:

a conforming mold to seat a first digit of the human subject in a first digit guide and a second digit of the human subject in a second digit guide;

an alcohol sensor module including:

a gas headspace selectively closed by contact with the first digit;

an alcohol sensor exposed to the gas headspace to detect the presence of ethanol within perspiration from the first digit into the gas headspace, the ethanol used to detect alcohol consumption by the human subject; and a biometric scanner module including:

a biometric identification scanner to identify the human subject using the second digit; and a processor configured to correlate the detected ethanol with alcohol consumption by the human subject and pair the correlated alcohol consumption by the human subject with the identification of the human subject.

* * * * *